US008849032B2

(12) United States Patent  (10) Patent No.: US 8,849,032 B2
Blennerhassett  (45) Date of Patent:  Sep. 30, 2014

(54) SHAPE PARAMETERISATION FOR EDITABLE DOCUMENT GENERATION

(75) Inventor: Michael John Blennerhassett, Chippendale (AU)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/410,074

(22) Filed: Mar. 1, 2012

(65) Prior Publication Data

US 2012/0230586 A1   Sep. 13, 2012

(30) Foreign Application Priority Data

Mar. 8, 2011  (AU) ................................. 2011201024

(51) Int. Cl.
*G06K 9/34*  (2006.01)
*G06T 9/20*  (2006.01)

(52) U.S. Cl.
CPC ........................................ *G06T 9/20* (2013.01)
USPC ............................ 382/173; 382/203; 382/218

(58) Field of Classification Search
USPC ................................................. 382/173, 203
See application file for complete search history.

(56) References Cited

U.S. PATENT DOCUMENTS

| 6,304,272 | B1 | 10/2001 | Schanel et al. | |
|---|---|---|---|---|
| 6,919,888 | B1 | 7/2005 | Perani et al. | |
| 7,403,880 | B2 | 7/2008 | Maille et al. | |
| 7,812,850 | B1 | 10/2010 | Nelson | |
| 8,180,158 | B2* | 5/2012 | Wu et al. ........................ | 382/203 |
| 2004/0062435 | A1* | 4/2004 | Yamaoka et al. ............. | 382/159 |
| 2008/0143735 | A1 | 6/2008 | Besley et al. | |
| 2008/0144942 | A1 | 6/2008 | Besley et al. | |
| 2012/0143037 | A1* | 6/2012 | Najarian et al. .............. | 600/407 |
| 2012/0230586 | A1* | 9/2012 | Blennerhassett ............. | 382/173 |

* cited by examiner

*Primary Examiner* — Gregory M Desire
(74) *Attorney, Agent, or Firm* — Canon USA, Inc. IP Division

(57) ABSTRACT

Disclosed is a method of forming an output shape parameterised by control points from an input shape. An input shape is received formed by a plurality of segments. The shape is classified as one of a plurality of predefined template shapes. The method then determines a representative form for the input shape based on a similarity measure between the input shape and the classified template shape. The representative form is selected according to the similarity measure from the group consisting of the classified template shape, and a non-template shape based on the segments of the input shape, the non-template shape having at least one control point derived from at least one control point of the classified template shape. The method then stores the determined representative form as the output shape parameterised by the derived control points.

15 Claims, 26 Drawing Sheets

SHAPE PARAMETERISATION FOR EDITABLE DOCUMENT GENERATION

REFERENCE TO RELATED PATENT APPLICATION

This application claims the benefit under 35 U.S.C. §119 of the filing date of Australian Patent Application No. 2011201024 filed Mar. 8, 2011, hereby incorporated by reference in its entirety as if fully set forth herein.

TECHNICAL FIELD

The current invention relates to image processing and, in particular, to processing an input shape to find shape parameters and control points for the creation of an editable document.

BACKGROUND

The proliferation of imaging technology combined with ever increasing computational processing power has led to many advances in the area of document analysis. A significant proportion of office documents are generated using structured text/graphics editing applications such as Microsoft™ Word™ and Microsoft™ Powerpoint™, both manufactured by Microsoft Corp. of U.S.A. In addition to formatted text editing, these text/graphics editing applications include basic figure drawing tools and options. An important class of applications used for document analysis, referred to as "scan-to-editable" applications, process a bitmap representation of a document to generate an electronic version of the document that can be viewed and edited using such editing applications.

Figure drawing options in a typical structured text/graphics editing application include freeform line drawing, template shapes and connectors (i.e., dynamic line objects that connect to and/or between template shapes within a document). The text/graphics editing applications may also include colouring, filling, layering and grouping options for sets of objects. Many commonly used geometric shapes can be created using template shapes. A user may prefer to use a template shape rather than drawing the shape using freeform lines as this option can be faster, more accurate in terms of representation of the desired shape, and easier to edit at a later time. The defining difference between a freeform shape and a template shape are control points, which allow faster modification of the template shape. The well-known Microsoft™ AutoShapes set includes a number of examples of template shapes which can be manipulated within editing environments such as Microsoft™ Word™ and PowerPoint™. Other template shapes may be found in OpenOffice.org™ editing applications such as the Writer™ and Impress™ applications.

Methods exist that process a scanned page to detect a configuration for a template shape, determine parameters of the template, and generate a template shape configured by the determined parameters for output. However, template shapes vary between applications, so a particular system will generally handle only a limited set of template shapes. If a particular object cannot be matched to one of the template shapes accurately, then the object is not matched. A non-matched object could persist as a bitmap object but may be vectorized for stretching and the like. A need therefore exists for a method of processing objects that cannot be accurately matched to a template shape by a system such that they can be output as configurable shapes.

SUMMARY

According to one aspect of the present disclosure, there is provided a method of forming an output shape parameterised by control points from an input shape. The method receives the input shape formed by a plurality of segments; classifies the input shape as one of a plurality of predefined template shapes; determines a representative form for the input shape based on a similarity measure between the input shape and the classified template shape, the representative form being selected according to the similarity measure from the group consisting of the classified template shape, and a non-template shape based on the segments of the input shape, the non-template shape having at least one control point derived from at least one control point of the classified template shape; and stores the determined representative form as the output shape parameterised by the derived control points.

Desirably the non-template shape with control points is formed by the steps of: (i) assigning each of the segments of the input shape to one of a number of regions of the classified template shape, each of the number of regions being assigned to a corresponding one of the control points of the classified template shape; describing the segments in terms of the regions associated with at least one control point for geometrical modification of the segments; and forming a representation of the input shape by the description of each region and at least one control point.

Alternatively the non-template shape with control points is formed by the steps of normalising the input shape to a unit square; identifying extreme points of the normalised shape; calculating the control parameters of the non-template shape based on the identified extreme points; and converting points on each of the segments of the input shape to be functions of the calculated control parameters.

In a further alternative, the non-template shape with control points is formed by the steps of determining an angle associated with a line of symmetry of the input shape associated; identifying symmetric pairs of points on the segments using the determined angle and line of symmetry; setting the identified points as control points; and converting points on each of the segments of the input shape to be functions of control parameters that correspond to the derived control points. Preferably this approach further comprises adding at least one fixed point at an intersection between the line of symmetry and the template shape to split a segment of the non-template shape.

In a further alternative the non-template shape with control points is formed by the steps of identifying a plurality of further shapes matching the input shape; selecting a centre point of one of the identified further shapes as a control point; assigning the control point of the further shape as a control point for the non-template shape; and converting a position of any remaining shape of the further shapes to be functions of the assigned control point.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
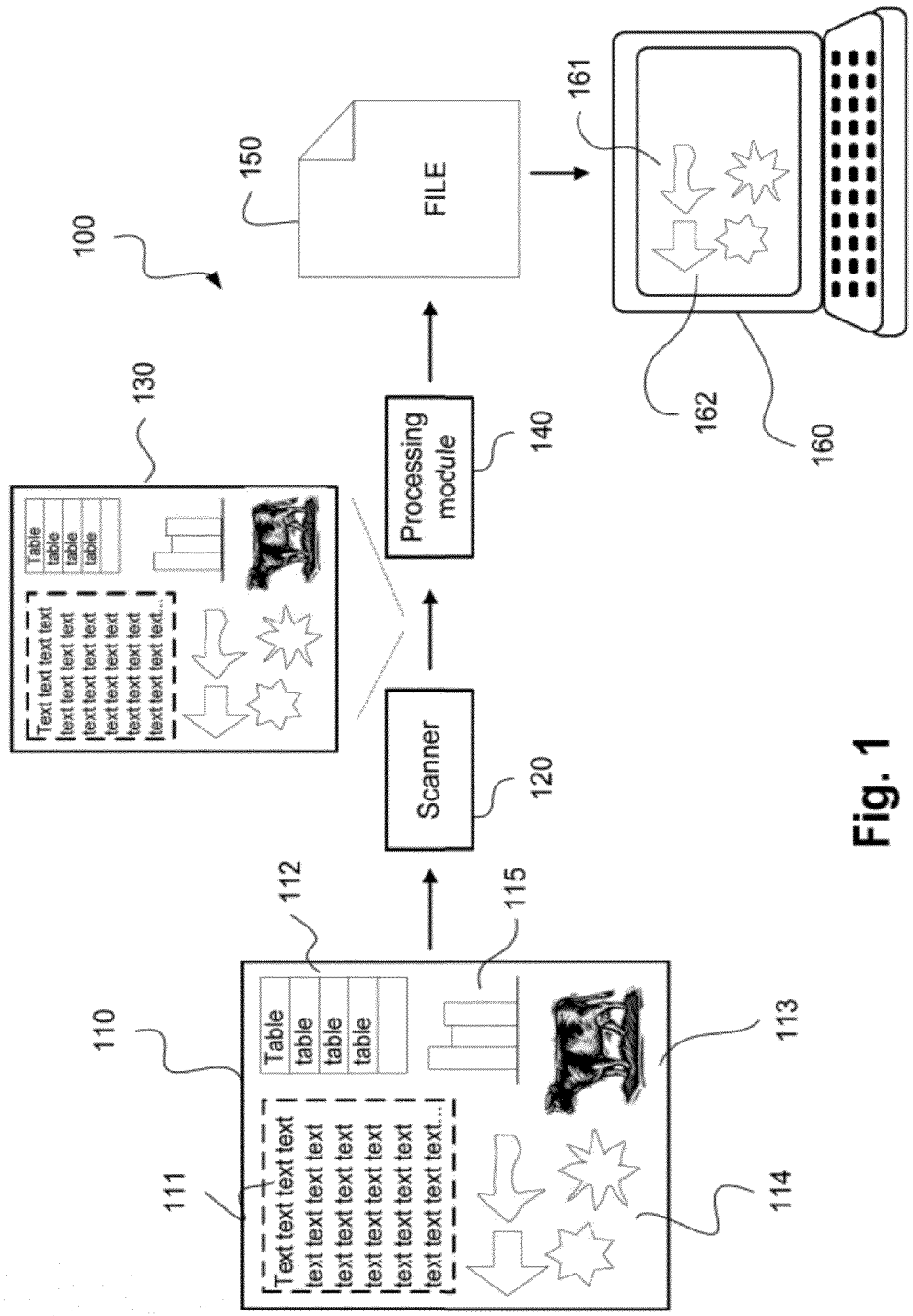
FIG. 1 illustrates a system in which the arrangements to be described may be implemented.

FIG. 1 illustrates a system 100 representing the environment in which the arrangements to be described may be practiced. A document 110 is scanned by a scanner 120 to form an input scanned document image 130 that may be stored in memory as a bitmap image. The input scanned document image 130 is processed in a processing module 140 in accordance with one or more the arrangements described herein. The processing module 140 may perform a number of bitmap image analysis processing stages including improving the quality of the output geometric objects. A file description, or object representation 150 of the bitmap image 130 (i.e., the scanned document) is generated by the processing module 140 that includes figure content in the form of template shapes, connectors, and freeform elements with various styles such as line styles, fill styles and arrowheads. The file 150 may include figure elements 161 and 162 (graphical objects) that are suitable for editing using a structured text/graphics editing application executing on a suitable device, such as a computer 160, to which the file 150 may be input.

The document 110 may be a compound document with a variety of content types. The content may include, but is not limited to, template shape elements 114, and charts 115, in addition to non-figure elements such as text 111, tables 112 and (bitmap) images 113. The document 110 can be produced using a variety of equipment including printers, fax machines, projectors, or more traditional media such as pen on paper or whiteboard and may be an imperfect representation of an original electronic document. The scanner 120 may be a stand-alone scanner, a handheld scanner, or a scanner embedded in a larger system, such as a multi-function printer. The scanner 120 may also be some other imaging device, such as a camera, a mobile phone, or a personal organiser. The scanner 120 may also introduce noise into the input bitmap image 130. Examples of the processing module 140 include a computer, a multi-functional printer, a mobile phone, or a personal organiser.

Figure 19A:
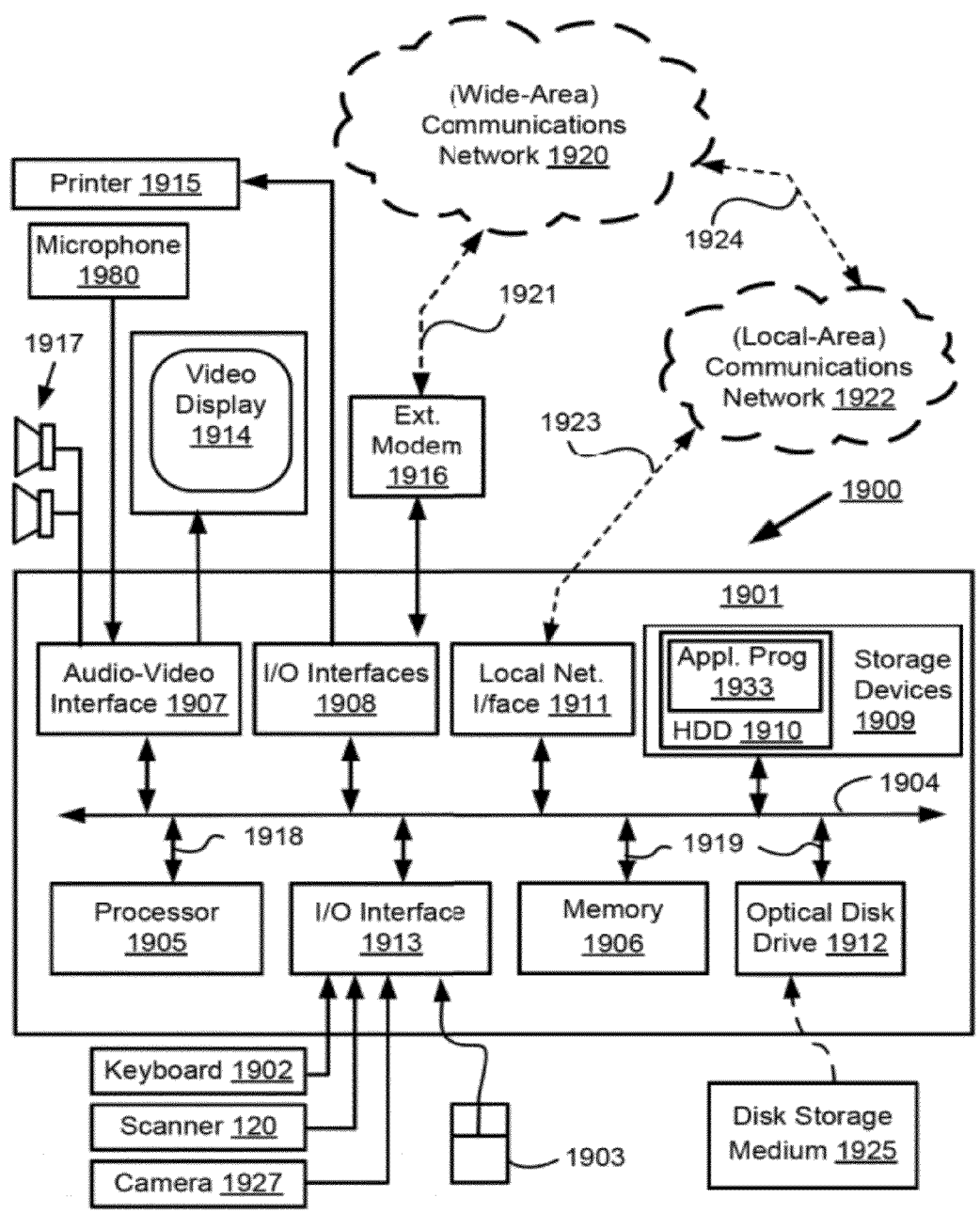
FIGS. 19A and 19B collectively form a schematic block diagram representation of an general purpose computer system upon which described arrangements can be practised.
Figure 19B:
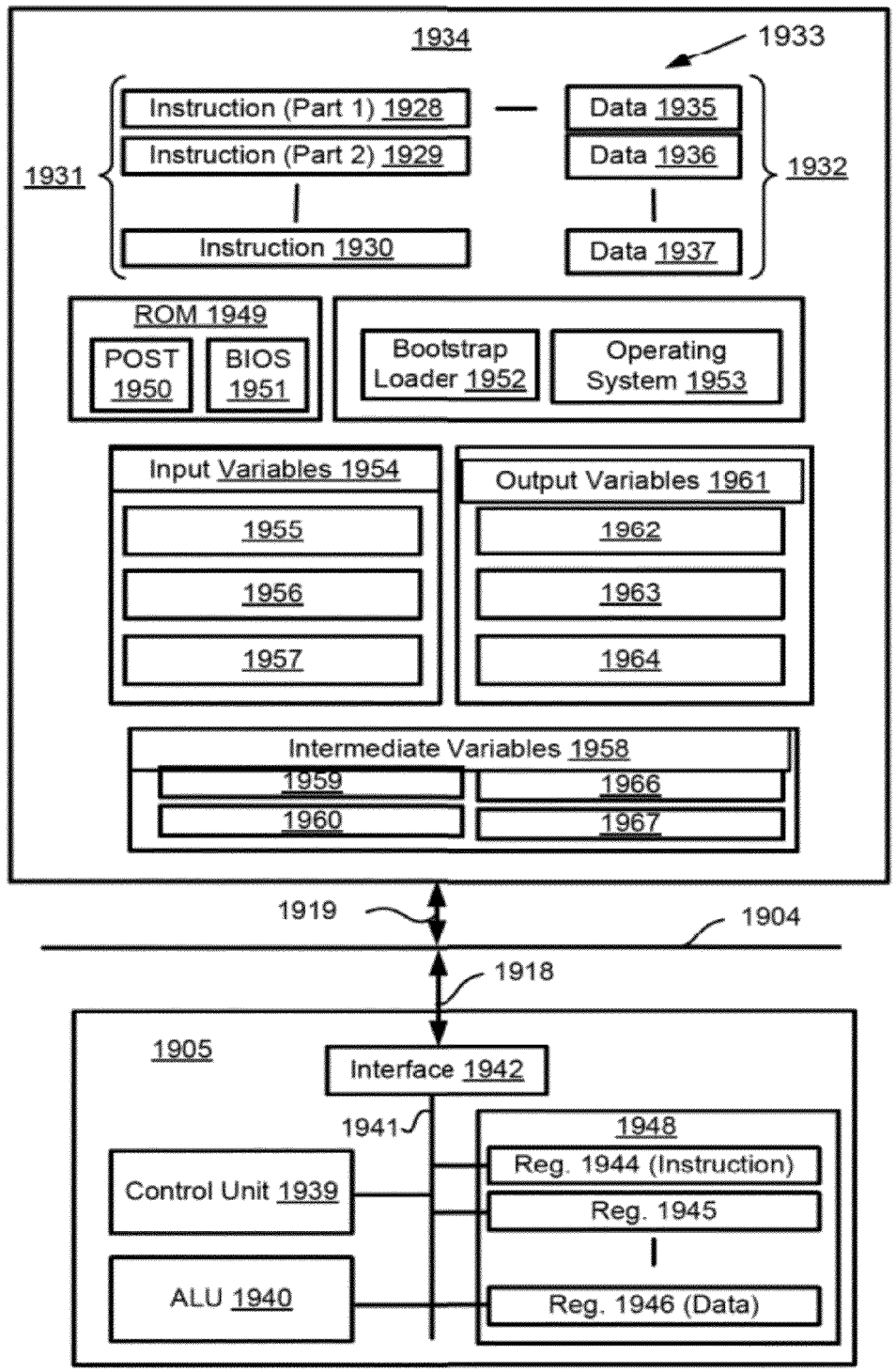

FIGS. 19A and 19B depict a general-purpose computer system 1900, upon which the various arrangements described can be practised.

As seen in FIG. 19A, the computer system 1900 includes: a computer module 1901; input devices such as a keyboard 1902, a mouse pointer device 1903, the scanner 120, a camera 1927, and a microphone 1980; and output devices including a printer 1915, a display device 1914 and loudspeakers 1917. Typically, the functions of the processing module 140 and computer 160 are performed by the computer module 1901 in association with the various input and output devices. An external Modulator-Demodulator (Modem) transceiver device 1916 may be used by the computer module 1901 for communicating to and from a communications network 1920 via a connection 1921, for example as a source of the document image 130. The communications network 1920 may be a wide-area network (WAN), such as the Internet, a cellular telecommunications network, or a private WAN. Where the connection 1921 is a telephone line, the modem 1916 may be a traditional "dial-up" modem. Alternatively, where the connection 1921 is a high capacity (e.g., cable) connection, the modem 1916 may be a broadband modem. A wireless modem may also be used for wireless connection to the communications network 1920.

The computer module 1901 typically includes at least one processor unit 1905, and a memory unit 1906. For example, the memory unit 1906 may have semiconductor random access memory (RAM) and semiconductor read only memory (ROM). The computer module 1901 also includes an number of input/output (I/O) interfaces including: an audio-video interface 1907 that couples to the video display 1914, loudspeakers 1917 and microphone 1980; an I/O interface 1913 that couples to the keyboard 1902, mouse 1903, scanner 120, camera 1927 and optionally a joystick or other human interface device (not illustrated); and an interface 1908 for the external modem 1916 and printer 1915. In some implementations, the modem 1916 may be incorporated within the computer module 1901, for example within the interface 1908. The computer module 1901 also has a local network interface 1911, which permits coupling of the computer system 1900 via a connection 1923 to a local-area communications network 1922, known as a Local Area Network (LAN). As illustrated in FIG. 19A, the local communications network 1922 may also couple to the wide network 1920 via a connection 1924, which would typically include a so-called "firewall" device or device of similar functionality. The local network interface 1911 may comprise an Ethernet circuit card, a Bluetooth™ wireless arrangement or an IEEE 802.11 wireless arrangement; however, numerous other types of interfaces may be practiced for the interface 1911.

The I/O interfaces 1908 and 1913 may afford either or both of serial and parallel connectivity, the former typically being implemented according to the Universal Serial Bus (USB)

standards and having corresponding USB connectors (not illustrated). Storage devices 1909 are provided and typically include a hard disk drive (HDD) 1910, upon which for example the document image 130 and the output file 150 may be stored. Other storage devices such as a floppy disk drive and a magnetic tape drive (not illustrated) may also be used. An optical disk drive 1912 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1900.

The components 1905 to 1913 of the computer module 1901 typically communicate via an interconnected bus 1904 and in a manner that results in a conventional mode of operation of the computer system 1900 known to those in the relevant art. For example, the processor 1905 is coupled to the system bus 1904 using a connection 1918. Likewise, the memory 1906 and optical disk drive 1912 are coupled to the system bus 1904 by connections 1919. Examples of computers on which the described arrangements can be practised include IBM-PC's and compatibles, Sun Sparcstations, Apple Mac™ or a like computer systems.

The methods of generating an editable document using shape parameterisation may be implemented using the computer system 1900 wherein the processes of FIGS. 2 to 18, to be described, may be implemented as one or more software application programs 1933 executable within the computer system 1900. In particular, the steps of the methods of editable document generation are effected by instructions 1931 (see FIG. 19B) in the software 1933 that are carried out within the computer system 1900. The software instructions 1931 may be formed as one or more code modules, each for performing one or more particular tasks. The software may also be divided into two separate parts, in which a first part and the corresponding code modules performs the editable document generation methods and a second part and the corresponding code modules manage a user interface between the first part and the user.

The software may be stored in a computer readable medium, including the storage devices described below, for example. The software is loaded into the computer system 1900 from the computer readable medium, and then executed by the computer system 1900. A computer readable medium having such software or computer program recorded on the computer readable medium is a computer program product. The use of the computer program product in the computer system 1900 preferably effects an advantageous apparatus for processing an input shape to find shape parameters and control points for the generation of an editable document.

The software 1933 is typically stored in the HDD 1910 or the memory 1906. The software is loaded into the computer system 1900 from a computer readable medium, and executed by the computer system 1900. Thus, for example, the software 1933 may be stored on an optically readable disk storage medium (e.g., CD-ROM) 1925 that is read by the optical disk drive 1912. A computer readable medium having such software or computer program recorded on it is a computer program product. The use of the computer program product in the computer system 1900 preferably effects an apparatus for editable document generation.

In some instances, the application programs 1933 may be supplied to the user encoded on one or more CD-ROMs 1925 and read via the corresponding drive 1912, or alternatively may be read by the user from the networks 1920 or 1922. Still further, the software can also be loaded into the computer system 1900 from other computer readable media. Computer readable storage media refers to any non-transitory tangible storage medium that provides recorded instructions and/or data to the computer system 1900 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1901. Examples of transitory or non-tangible computer readable transmission media that may also participate in the provision of software, application programs, instructions and/or data to the computer module 1901 include radio or infra-red transmission channels as well as a network connection to another computer or networked device, and the Internet or Intranets including e-mail transmissions and information recorded on Websites and the like.

The second part of the application programs 1933 and the corresponding code modules mentioned above may be executed to implement one or more graphical user interfaces (GUIs) to be rendered or otherwise represented upon the display 1914. Through manipulation of typically the keyboard 1902 and the mouse 1903, a user of the computer system 1900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1917 and user voice commands input via the microphone 1980.

FIG. 19B is a detailed schematic block diagram of the processor 1905 and a "memory" 1934. The memory 1934 represents a logical aggregation of all the memory modules (including the HDD 1909 and semiconductor memory 1906) that can be accessed by the computer module 1901 in FIG. 19A.

When the computer module 1901 is initially powered up, a power-on self-test (POST) program 1950 executes. The POST program 1950 is typically stored in a ROM 1949 of the semiconductor memory 1906 of FIG. 19A. A hardware device such as the ROM 1949 storing software is sometimes referred to as firmware. The POST program 1950 examines hardware within the computer module 1901 to ensure proper functioning and typically checks the processor 1905, the memory 1934 (1909, 1906), and a basic input-output systems software (BIOS) module 1951, also typically stored in the ROM 1949, for correct operation. Once the POST program 1950 has run successfully, the BIOS 1951 activates the hard disk drive 1910 of FIG. 19A. Activation of the hard disk drive 1910 causes a bootstrap loader program 1952 that is resident on the hard disk drive 1910 to execute via the processor 1905. This loads an operating system 1953 into the RAM memory 1906, upon which the operating system 1953 commences operation. The operating system 1953 is a system level application, executable by the processor 1905, to fulfil various high level functions, including processor management, memory management, device management, storage management, software application interface, and generic user interface.

The operating system 1953 manages the memory 1934 (1909, 1906) to ensure that each process or application running on the computer module 1901 has sufficient memory in which to execute without colliding with memory allocated to another process. Furthermore, the different types of memory available in the system 1900 of FIG. 19A must be used properly so that each process can run effectively. Accordingly, the aggregated memory 1934 is not intended to illustrate how particular segments of memory are allocated (unless otherwise stated), but rather to provide a general view of the memory accessible by the computer system 1900 and how such is used.

As shown in FIG. 19B, the processor 1905 includes a number of functional modules including a control unit 1939, an arithmetic logic unit (ALU) 1940, and a local or internal memory 1948, sometimes called a cache memory. The cache memory 1948 typically include a number of storage registers 1944-1946 in a register section. One or more internal busses 1941 functionally interconnect these functional modules. The processor 1905 typically also has one or more interfaces 1942 for communicating with external devices via the system bus 1904, using a connection 1918. The memory 1934 is coupled to the bus 1904 using a connection 1919.

The application program 1933 includes a sequence of instructions 1931 that may include conditional branch and loop instructions. The program 1933 may also include data 1932 which is used in execution of the program 1933. The instructions 1931 and the data 1932 are stored in memory locations 1928, 1929, 1930 and 1935, 1936, 1937, respectively. Depending upon the relative size of the instructions 1931 and the memory locations 1928-1930, a particular instruction may be stored in a single memory location as depicted by the instruction shown in the memory location 1930. Alternately, an instruction may be segmented into a number of parts each of which is stored in a separate memory location, as depicted by the instruction segments shown in the memory locations 1928 and 1929.

In general, the processor 1905 is given a set of instructions which are executed therein. The processor 1105 waits for a subsequent input, to which the processor 1905 reacts by executing another set of instructions. Each input may be provided from one or more of a number of sources, including data generated by one or more of the input devices 1902, 1903, data received from an external source across one of the networks 1920, 1902, data retrieved from one of the storage devices 1906, 1909 or data retrieved from a storage medium 1925 inserted into the corresponding reader 1912, all depicted in FIG. 19A. The execution of a set of the instructions may in some cases result in output of data. Execution may also involve storing data or variables to the memory 1934.

The disclosed arrangements use input variables 1954, which are stored in the memory 1934 in corresponding memory locations 1955, 1956, 1957. The arrangements produce output variables 1961, which are stored in the memory 1934 in corresponding memory locations 1962, 1963, 1964. Intermediate variables 1958 may be stored in memory locations 1959, 1960, 1966 and 1967.

Referring to the processor 1905 of FIG. 19B, the registers 1944, 1945, 1946, the arithmetic logic unit (ALU) 1940, and the control unit 1939 work together to perform sequences of micro-operations needed to perform "fetch, decode, and execute" cycles for every instruction in the instruction set making up the program 1933. Each fetch, decode, and execute cycle comprises:

(a) a fetch operation, which fetches or reads an instruction 1931 from a memory location 1928, 1929, 1930;

(b) a decode operation in which the control unit 1939 determines which instruction has been fetched; and (c) an execute operation in which the control unit 1939 and/or the ALU 1940 execute the instruction.

Thereafter, a further fetch, decode, and execute cycle for the next instruction may be executed. Similarly, a store cycle may be performed by which the control unit 1939 stores or writes a value to a memory location 1932.

Each step or sub-process in the processes of FIGS. 2 to 18 is associated with one or more segments of the program 1933 and is performed by the register section 1944, 1945, 1947, the ALU 1940, and the control unit 1939 in the processor 1905 working together to perform the fetch, decode, and execute cycles for every instruction in the instruction set for the noted segments of the program 1933.

The term "template shape" as used herein refers to a predetermined model that defines the form of a modifiable non-textual shape object with a closed outer boundary within a specified editing or viewing environment. Accordingly, the template shapes described herein are "modifiable closed-form non-textual template shapes". Many template shapes consist of a single closed outer boundary, although some, such as the "can" template shape 27102 shown in FIG. 2B, include other internal lines. Some other template shapes, such as the "sun" template shape 27104 in FIG. 2B are made of more than one closed outer boundary, and are referred to herein as "disjoint template shapes". A template shape is specified by a plurality of parameters the interpretation of which is defined within a model for the template shape. The plurality of parameters can include affine parameters, control parameters and line thickness parameters. The parameters defining a template shape are described in further detail below.

Figure 2A:
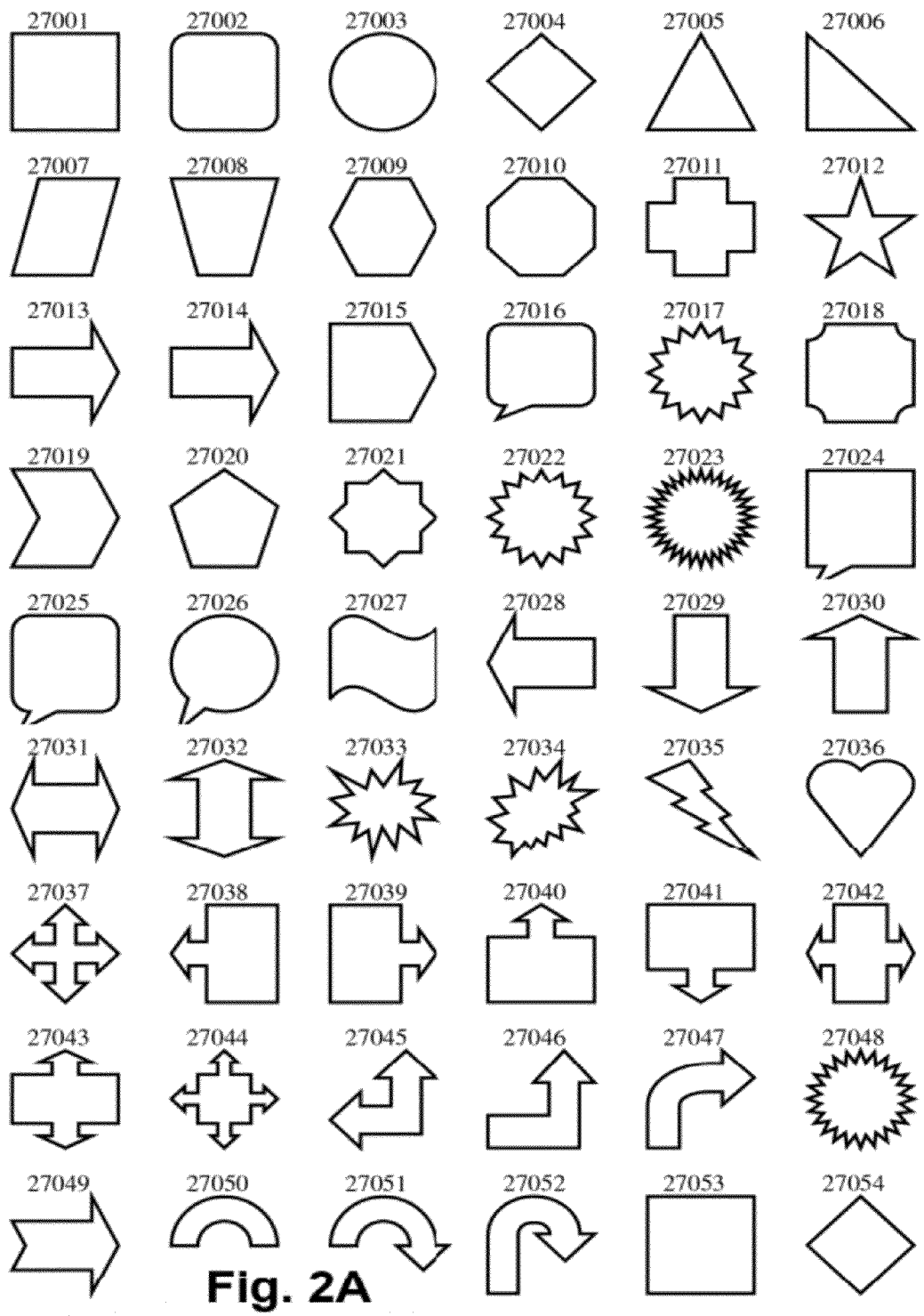
FIG. 2A shows a selection of Microsoft™ Autoshapes.
Figure 2B:
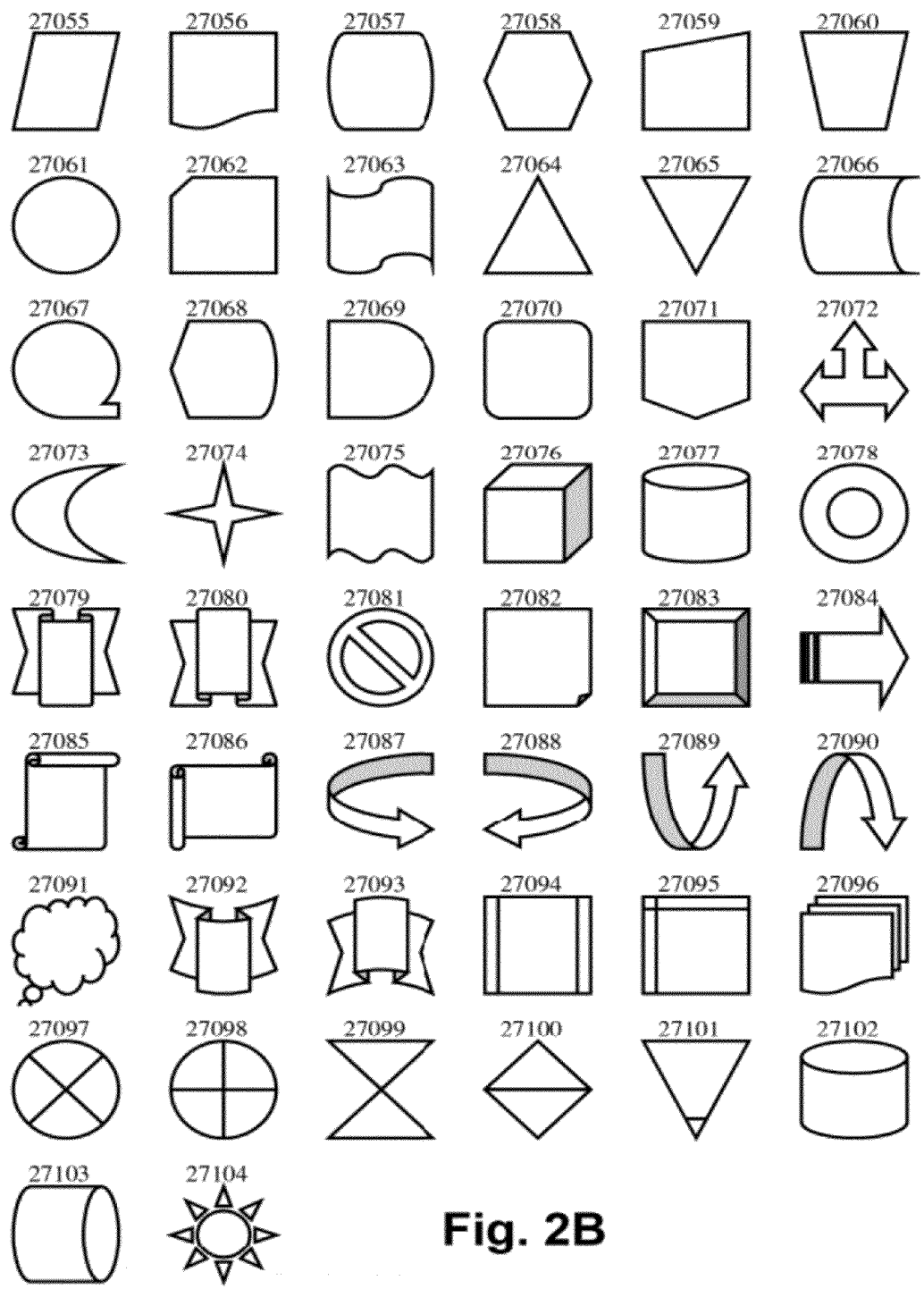
FIG. 2B shows another selection of Microsoft™ Autoshapes.

FIGS. 2A and 2B show a selection of one hundred and four Microsoft™ Autoshapes 27001 to 27104 which are a set of template shapes. Further, Appendix A is a Table listing the names of each of the Microsoft™ AutoShapes of FIGS. 2A and 2B, together with their drawing reference in FIGS. 2A and 2B.

The affine parameters of the template shape define modifications to the closed-form non-textual template shape. Such modifications may be described by an affine transform. The modifications include scaling, rotation and offset. For scaling of sx and sy along the x- and y-axes respectively, a rotation of θ, and offsets of Δx and Δy along the x- and y-axes respectively, the affine transform may be represented in accordance with Equation 1 below:

$$A = \begin{pmatrix} -\sin\theta & \cos\theta \\ \cos\theta & \sin\theta \end{pmatrix} \cdot \begin{pmatrix} sx & 0 \\ 0 & sy \end{pmatrix} + \begin{pmatrix} \Delta x & 0 \\ 0 & \Delta y \end{pmatrix} \quad (1)$$

Control parameters define further geometrical modifications to the template shape that in general cannot be defined in terms of an affine transform of the template shape. Each template shape has a defined set of N control parameters, where N is specified by the model and may be zero. Template shapes may be defined entirely by straight edges (i.e. polygons) or curves, or may comprise a mixture of straight edges and curve sections between a set of vertices. Each control parameter typically modifies a plurality of vertices, a plurality of curve sections, or both a plurality of vertices and curve sections. Control parameters are typically modified by moving one or more control points. Control points are generally visible when the shape is selected within a graphical user interface (GUI). In many GUIs, control points appears for example as small yellow diamonds. In the drawings forming part of this patent specification, the control points are shown as small solid black squares. The user may select and modify the position of the control points relative to the shape being controlled using the mouse or other form of user input within the GUI. Control points can have a variety of different constraints applied to them, such as start and end limits or be movable in x-axis or y-axis only. Control parameters are functions of the x-axis and y-axis position relative to the bounding box of the template shape of one or more control points. One control point can be the input to multiple control parameters.

Figure 3:
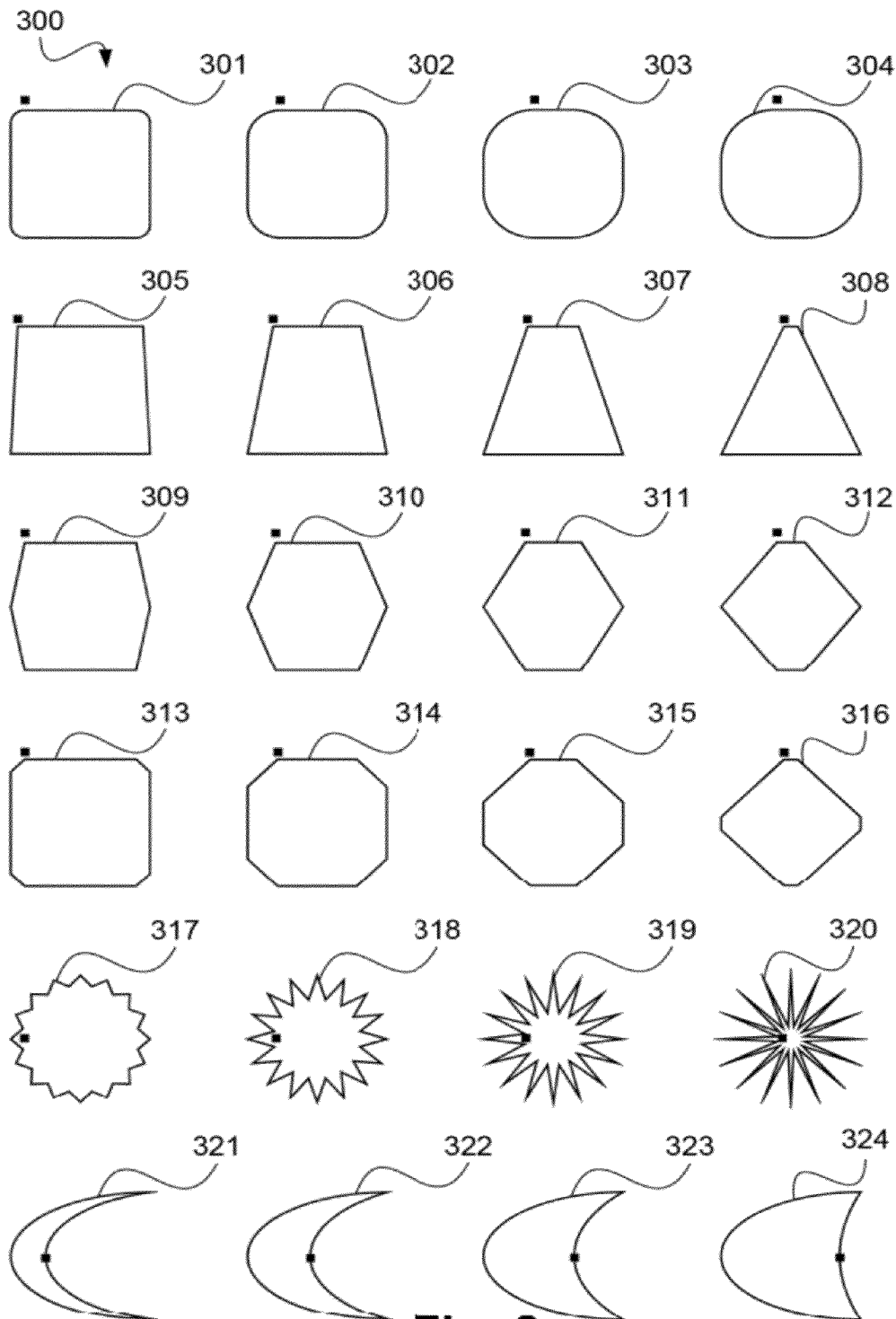
FIG. 3 is a set of Autoshapes each with one template parameter showing how they individually deform.

The effect of modifying the control points (and hence the control parameters) of a template shape is defined by the template model for the template shape. The control parameters may be used for modifying the closed-form non-textual template shapes in a non-affine manner. A set 300 of example template shapes 301 to 324 with one control point is illustrated in FIG. 3. Adjacent to each template shape 301-324 is a black square representing the control point, the x-coordinate of which represents the value of the corresponding control parameter. FIG. 3 includes a set of rounded rectangles (i.e., 301 to 304), for which the control parameter modifies the radius of curvature of the rounded corners. FIG. 3 also includes trapezoids (i.e., 305 to 308), hexagons (i.e., 309 to 312) and octagons (i.e., 313 to 316) for which the control parameter defines the point of intersection of a line on the left side of the template shape with the upper horizontal section. FIG. 3 also includes 16-point seals (i.e., 317 to 320) for which the control parameter (e.g., 326) defines the relative radii of the inner and outer vertices. Finally, FIG. 3 includes moon shapes (i.e., 321 to 324) for which the control parameter (e.g., 327) defines the phase of the moon shape.

A typical scale used for control parameters has a maximum range of 0 to 1 where, for example, a horizontal parameter such as used in the hexagon 309 to 312 would be 0 on the far left, and 0.5 when the modifiable point is brought into the middle. 0.5 is then the maximum value for this shape, but a control parameter which ranges all the way from left to right, such as the parallelogram 27007 in FIG. 2A would take the full set of values from 0 to 1.

Figure 4:
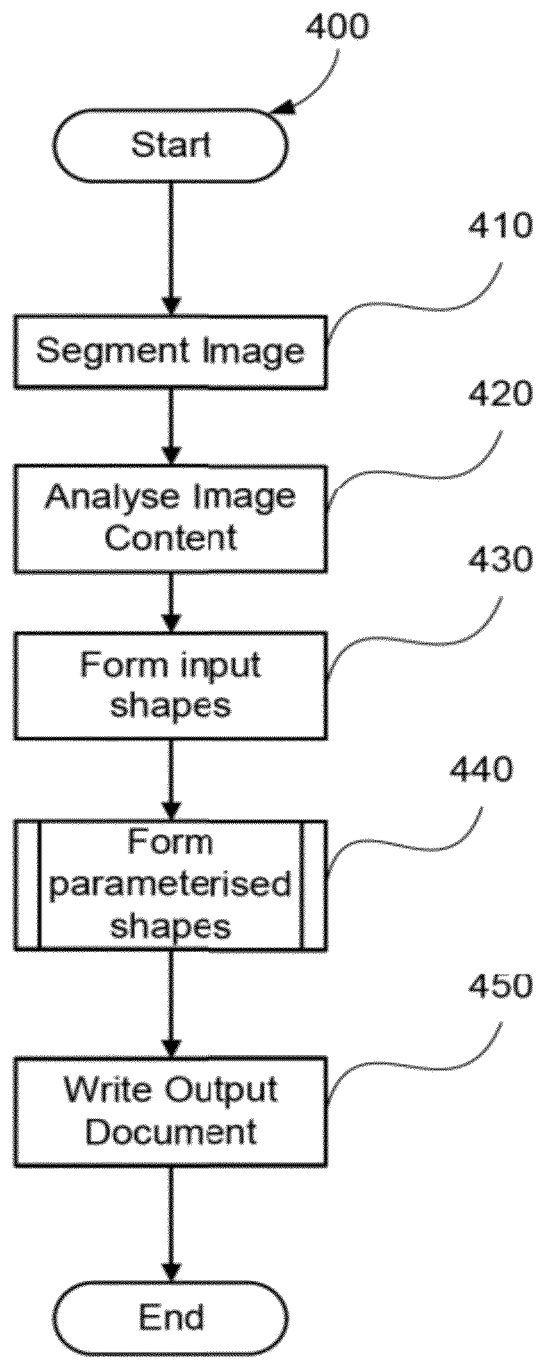
FIG. 4 is a flowchart of a first approach for generating an editable document using shape parameterisation.

FIG. 4 illustrates a first approach 400 used to create an output document file 150 by processing module 140. The method 400 is typically realised as a software application program stored on the HDD 1910 and executable by the processor 1905. In step 410, the input image 130 is retrieved from the HDD 1910 by the processor 1905 and segmented. During segmentation, the processor 1905 examines pixel values in the input image 130 to find regions of approximately constant or in some cases approximately smoothly varying colour. The identified regions may be temporarily stored in the memory 1906. The regions are then joined together based on proximity, with the output of the segmentation process 410 being a set of constant colour or smooth gradient objects corresponding to regions of the input image 130. Each shape in the original document 110 is typically represented by one object for the line region and one for the fill region. Some objects may include multiple shapes connected together, such as in a flow chart.

In step 420, the objects produced by the segmentation 410 are analysed using page layout analysis. In this process 420, the processor 1905 identifies what type of content each object corresponds to, distinguishing content types such as text 111, table 112, images 113, and figure elements 114 and 115. The process 420 selects the objects corresponding to figure elements for further processing described below in relation to vectorization step 430. In some applications a full page layout analysis might not be used, but instead all objects, or almost all objects excepting a few of inappropriate sizes, may be selected to be analysed as potential figure elements.

In a vectorization step 430, a shape creation method is applied by the processor 1905 to the objects selected as potential figure objects by the analysis of image content step 420. This shape creation method converts the pixels of the objects selected into an approximate vector representation of zero or more (straight) line segments and zero or more curve segments, there being at least one line segment or one curve segment. These segments are approximate vector representations of the objects and are referred to herein as freeform shapes or non-template shapes. Each input shape is defined by at least one such segment. The segments defining a shape may be formed as a list for ease of storage or management. Many existing vectorization techniques can be used to perform the vectorization step 430.

As each shape in the original document 110 is typically represented by one object for the line region and one for the fill region, line freeforms may be created by various known vectorization methods such as thinning, polygonisation of the objects followed by contour matching, or transform based techniques. Line freeforms may not be closed, but may still be mostly similar to a template shape, many of which are closed. Open line freeforms may be processed in the same way as closed freeform shapes by linking the ends of lines to other nearby line ends.

Figure 8A:
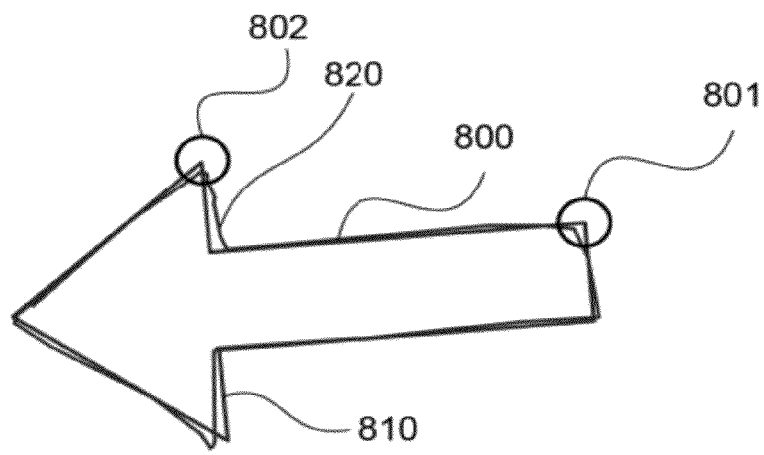
FIGS. 8A to 8D show an example input freeform object, the closest template match and how the control points may be created.
Figure 8B:
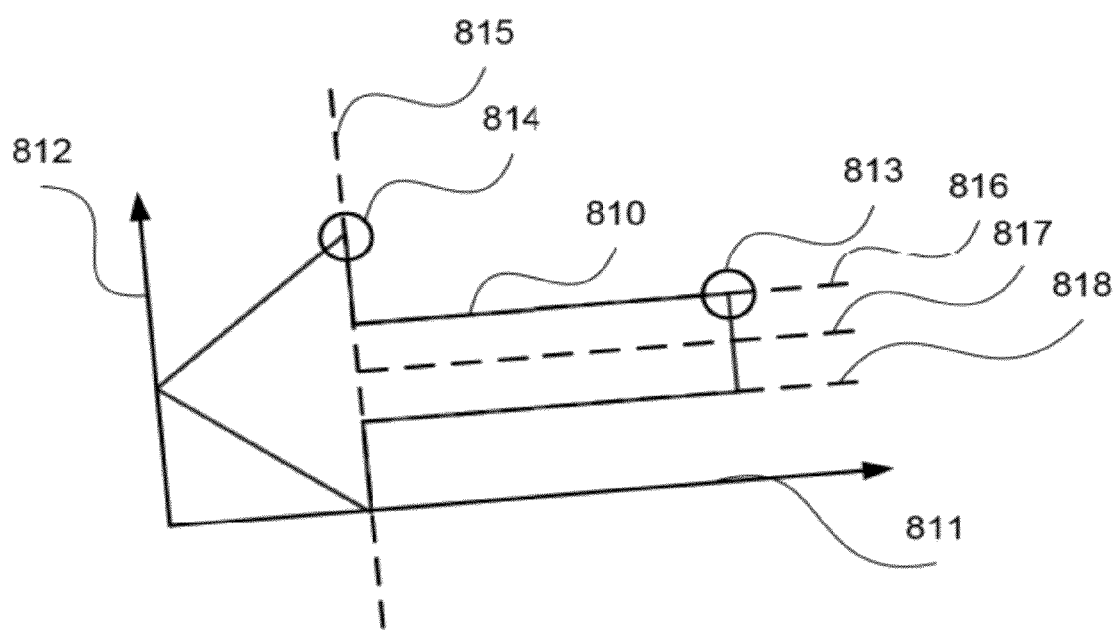
Figure 8C:
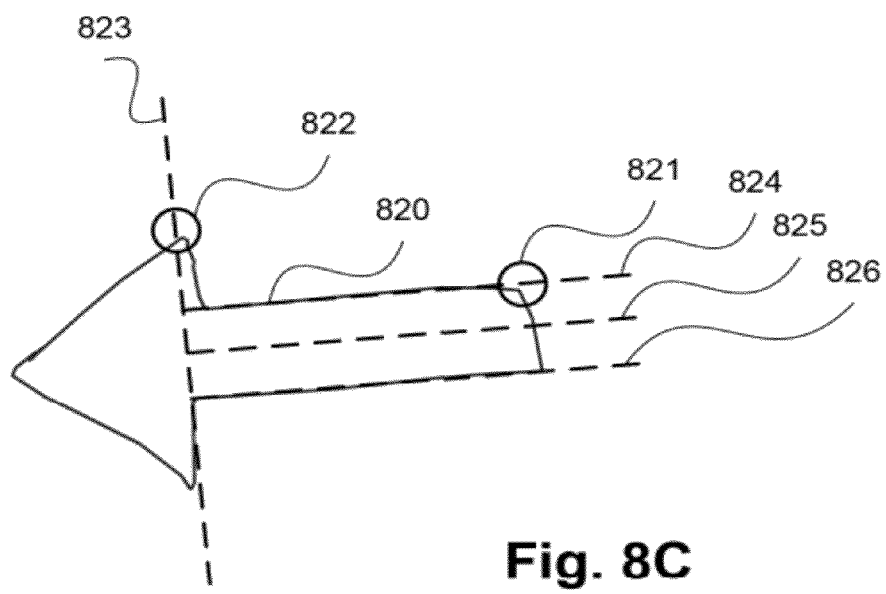
Figure 8D:
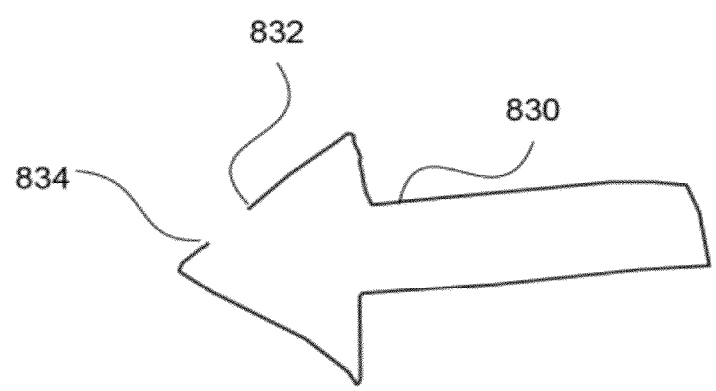

FIG. 8D shows an example open line freeform 830 which can be processed as a closed line freeform by linking the ends 832 and 834 of the line together. In general it may be possible to associate the fill object with the line object to create a freeform shape which has both a line and a fill, along with various parameters such as line thickness and line and fill colour. All the example template shapes shown in FIGS. 2A and 2B are line freeforms, having a black line with a given thickness and a white or grey fill.

Figure 8E:
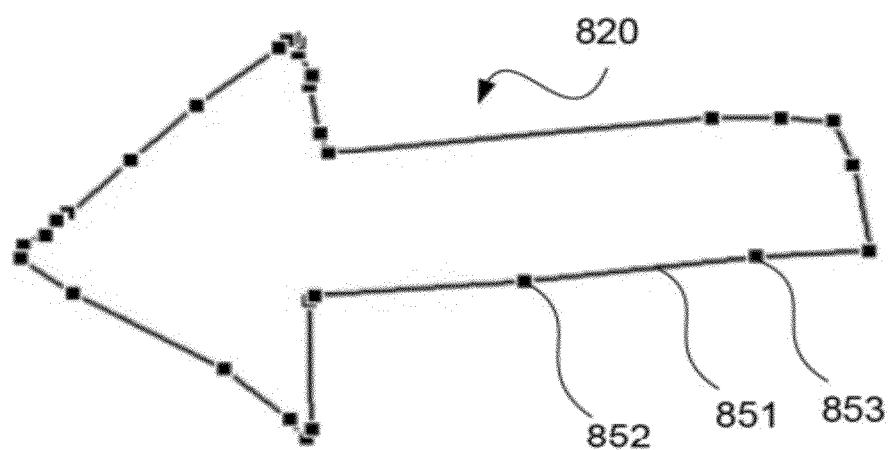
FIG. 8E illustrates segmentation of a freeform arrow shape.
Figure 8F:
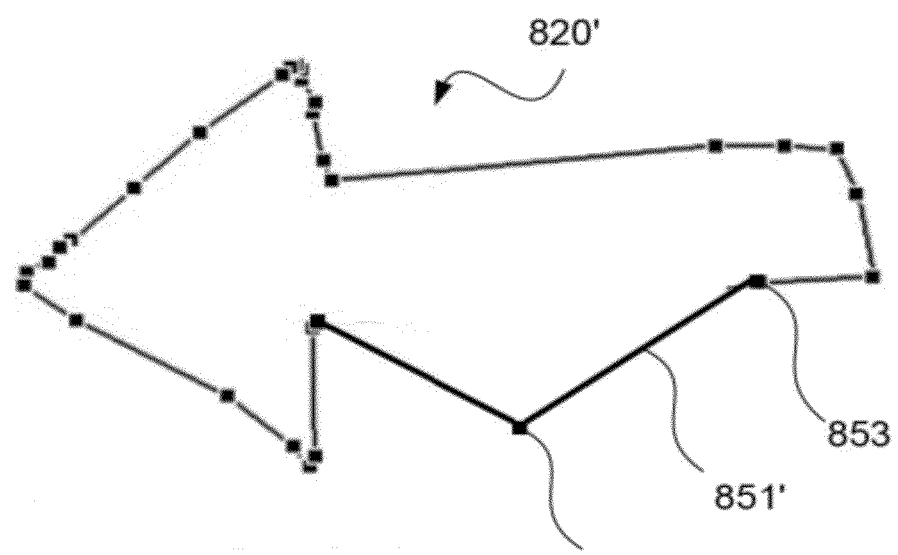
FIG. 8F illustrates editing of the shape of FIG. 8E by manipulation of a control point.
Figure 9A:
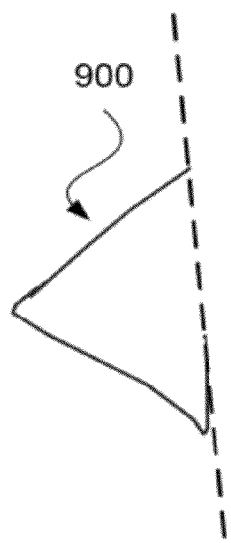
FIGS. 9A to 9E show an example input freeform and the different regions based on the matched template shape.
Figure 9B:
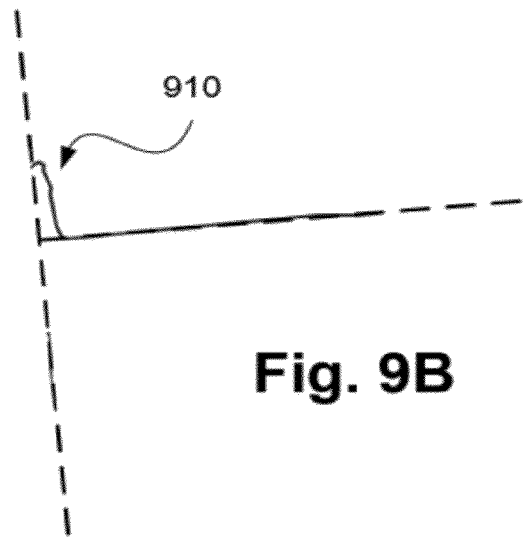
Figure 9C:
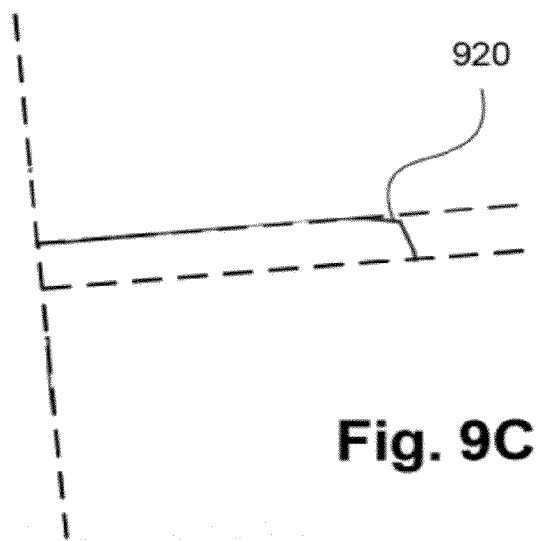
Figure 9D:
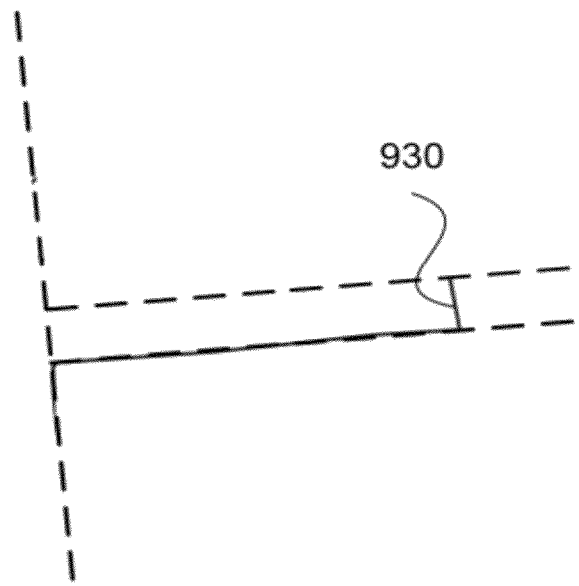
Figure 9E:
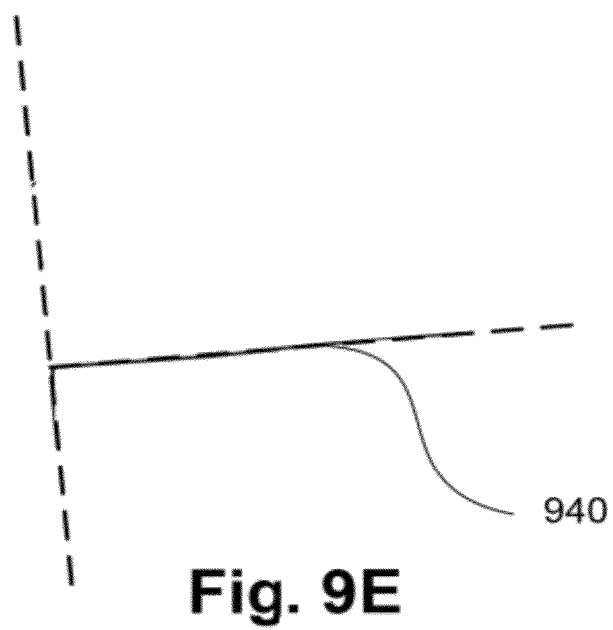

FIG. 8E shows a freeform arrow 820 that has been scanned and vectorized. The outline of the arrow 820 has been decomposed into a sequence of straight line segments, such as segment 851. Each segment is defined by a start and end points, such as points 852 and 853 that define the segment 851 and all points thereon. The vector representation of the arrow 820 can be saved by storing the start and end points in a list to allow reconstruction of the segments. The start and end points may be used as control points for potential modification of the vectorized shape, for example by a user clicking and dragging the control point via a GUI such as discussed above. An example of such modification is seen in FIG. 8F where the control point 852 has been manually moved via a GUI to be a point 852', thus altering the segment 851 to be a segment 851' and thereby editing the shape 820 to give an new shape 820'.

Returning to FIG. 4, in step 440, a process of forming parameterised shapes is applied by the processor 1905 to the freeform shapes (segments) created in step 430. The parameterised shapes formed may be template shapes as described above or they may be freeform shapes with control points which are derived from one or more template shapes. Particularly, step 440 determines a representative form for the input shape based on a similarity measure between the input shape and a classified template shape. The representative form is selected according to a similarity measure from a group consisting of the classified template shape and a non-template shape, based on the segments having at least one control point of the representative form derived from control points of the classified template shape. This process will be discussed in more detail with reference to FIG. 5 below.

Finally, in step 450, the output document file 150 is created by the processor 1905. This document includes a representation of the template shapes and freeform shapes from step 430 with control points (the representative form) as produced by step 440. This output file 150 may be written in the Microsoft™ (OOXML) Office Open XML format for Microsoft™ Word™ or PowerPoint™, or may alternatively for example be written in the OpenDocument file format (ODF). Various other file formats may also be suitable. The output document may also include the results of analysis of other types of content such as text.

Figure 5:
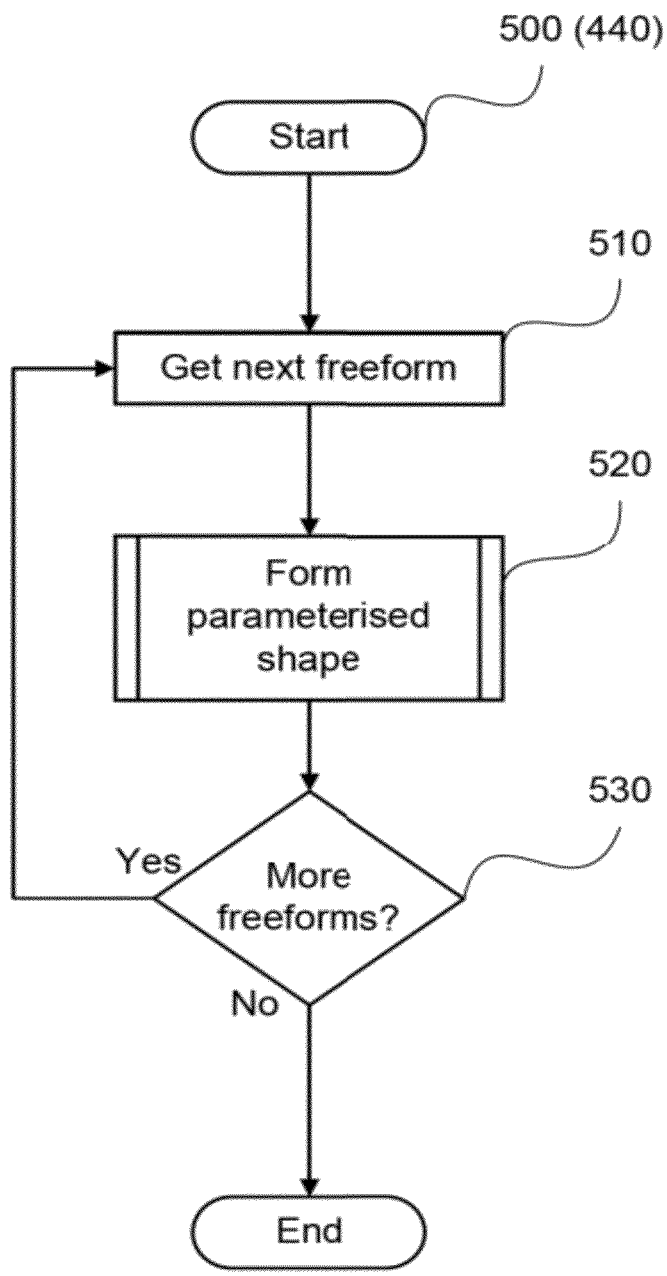
FIG. 5 is a flowchart showing how a set of input freeforms are processed.

FIG. 5 illustrates the process 500 used to form parameterised shapes of step 440 in FIG. 4. In step 510, a next unprocessed freeform shape is selected. In step 520 a parameterised shape is formed by the processor 1905 using a process that is described with reference to FIG. 6. In step 530 a test is made by the processor 1905 to determine if there are more unprocessed freeform shapes. If there are none, then process 500 is finished. Otherwise, the next freeform shape is selected at step 510.

Figure 6:
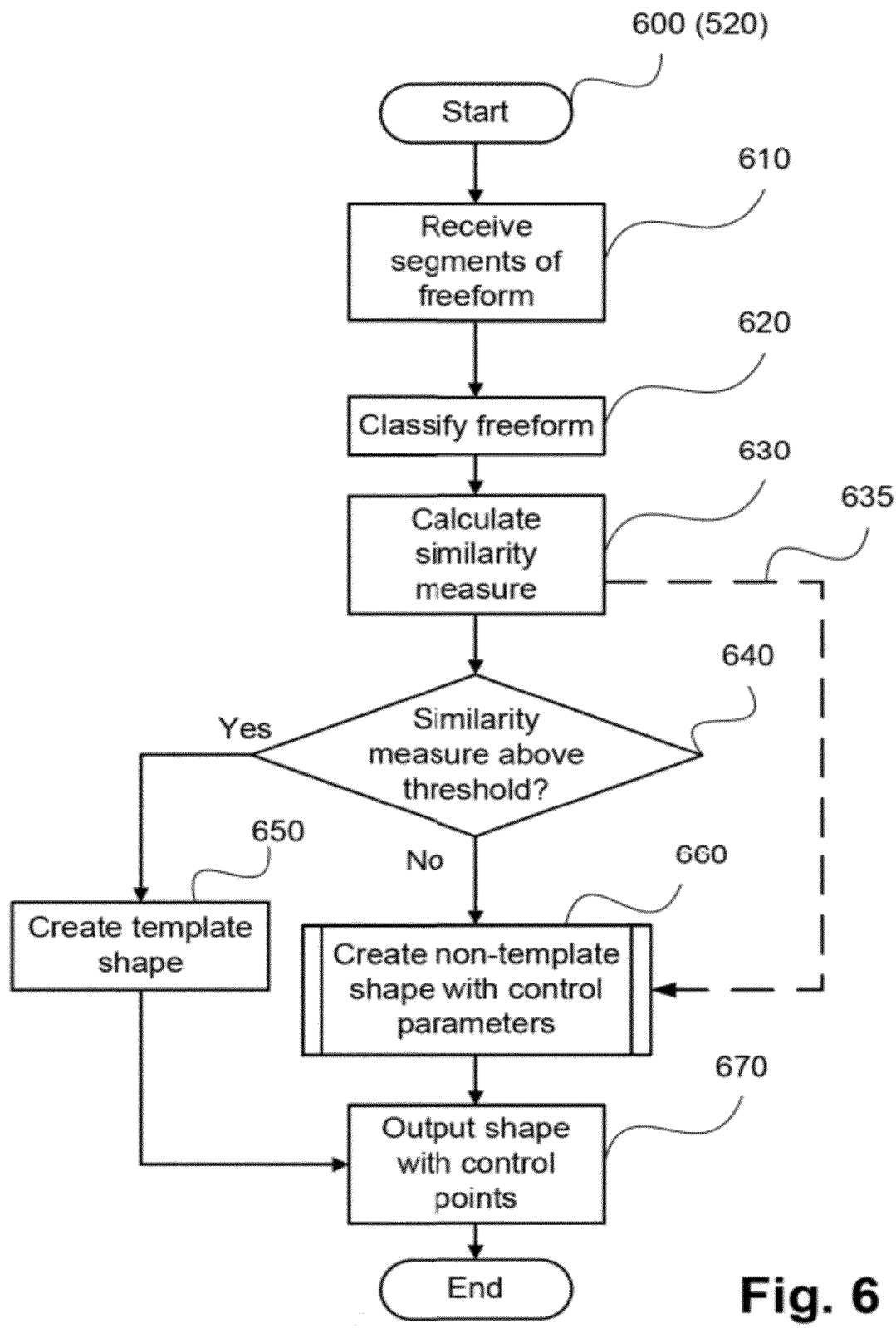
FIG. 6 is a flowchart showing how each individual input freeform is processed.

FIG. 6 illustrates a process 600 used to form a parameterised shape from a freeform shape as discussed in step 520. At a receiving step 610, the input freeform shape comprising at least one line segment and/or at least one curve segments is received from the freeform shape generating step 430. The line and curve segments may be used to classify the freeform shape in a classification step 620. In the classification step 620, the processor 1905 selects one or more template shapes, which may be temporarily stored in the memory 1906, to which the input freeform shape is similar. One method which can be used to perform the classification step 620 is a machine learning classifier based on inputs derived from the line and curve segments of the freeform shape. A large number of training template shapes can be created with various control parameter values, with the area of the template shape being normalised to one (unit squared), the (1,1) central moment normalised to zero and the (2,0) and (0,2) central moments normalised to be equal. A sampling of the perpendicular distance from the unit circle can then be Fourier transformed to produce the feature training data for a machine classifier, such as a Support Vector Machine (SVM). This will produce a number of SVMs, one for each pair of template training shapes, which are used to decide whether the input shape is one template shape or another. The normalising procedure can then be applied to the input freeform shape and all of the SVMs applied to the result. This will produce a score for each template shape, and the template shapes with the highest scores can be selected as being similar. Alternatively, if there is only a small number of template shapes, then all of them can be selected at classification step 620.

At the classification step 620, the parameters of the template shapes that are similar are also calculated. The parameters of the template shapes, as described above, include scaling and rotation, as well as any control parameters particular to the template shape. One method for calculating the control parameters of a template shape to closely match those of a freeform shape is to affine normalise the freeform shape so that the area is unity, the (1,1) central moment is zero, and the (2,0) and (0,2) central moments are equal. The Zernike moments can then be calculated for the input freeform shape and a template shape with an initial set of control parameters. Multi-dimensional functional minimisation, such as the downhill simplex method, can then be used to find the set of control parameters that minimise the distance between the freeform shape's Zernike moments and the template shape's Zernike moments. One method for calculating the scale estimation for an input shape is to use the (2,0) and (0,2) central moments for the input freeform shape and compare to the (2,0) and (0,2) central moments of the template shape (with control parameters applied). One method for calculating the rotation estimate is to divide the template shape (with scaling and control parameters applied) and the input freeform shape into a number of equally sized wedges (e.g. 64) centred on each shape. The area of the shape inside each wedge can then be correlated between the two shapes, with the peak in the correlation function giving the rotation angle estimate.

In step 630, a similarity measure, or match score, is calculated by the processor 1905 to evaluate how well the template shapes with parameters applied found in the previous classification step 620 match the freeform shape. Various techniques may be used to calculate the similarity measure, such as a normalised area based mismatch, Hausdorff distance, or earth-movers distance. In general, for the technique to be useful for step 630, the difference between the union and the intersection of the template shape and the input freeform shape should be penalised. The similarity measure may be calculated such that a higher similarity measure or score indicates a closer visual match than a lower measure. At decision step 640, if the similarity measure is greater than or equal to a given threshold for the template shape with the highest similarity measure, then a template shape is created at step 650. The template shape created at step 650 has all of the parameters found in step 620 applied, being the classified template shape, so it will be similar to the input freeform shape as measured by the match score in step 630. It may be the case that a specific template shape can be represented using a smaller description in the output document than a freeform shape, or a freeform shape with control parameters.

The similarity measure decision threshold at step 640 may be set at the maximum for the similarity measure range, in which case it is possible to output a freeform shape with control points at step 660 which looks and behaves exactly identical to a template shape, but this may not be useful or desirable. It is also possible that the template shape matched at step 630 is not a template shape that can be represented as such in the particular output file 150. If this is the case, then decision step 640 may be skipped and processing flows to step 660, as indicated by dashed line 635.

If the decision at step 640 is that the similarity measure is less than the similarity measure threshold, and the matched template shape has no control points, then the input freeform is output unmodified as the output shape. Flow then continues at step 530 from FIG. 5. If the decision at step 640 is that the similarity measure is less than the similarity measure threshold, then a non-template shape with control points is created at step 660. Method 700 of FIG. 7 may be used to perform the process at step 660. The generated non-template shape consists of a geometric description that is a function of a set of parameters including control parameters. The geometric description provides for geometrical modification of the segments and thus the associated object. A set of parameters for the non-template shape that configure it according to the freeform shape segments are also returned. In both cases the input freeform shape is now output as a shape with control points, either as a template or as a non-template version, at step 670. At this stage the output shape including the determined representative form may be stored to the HDD 1910.

Figure 7:
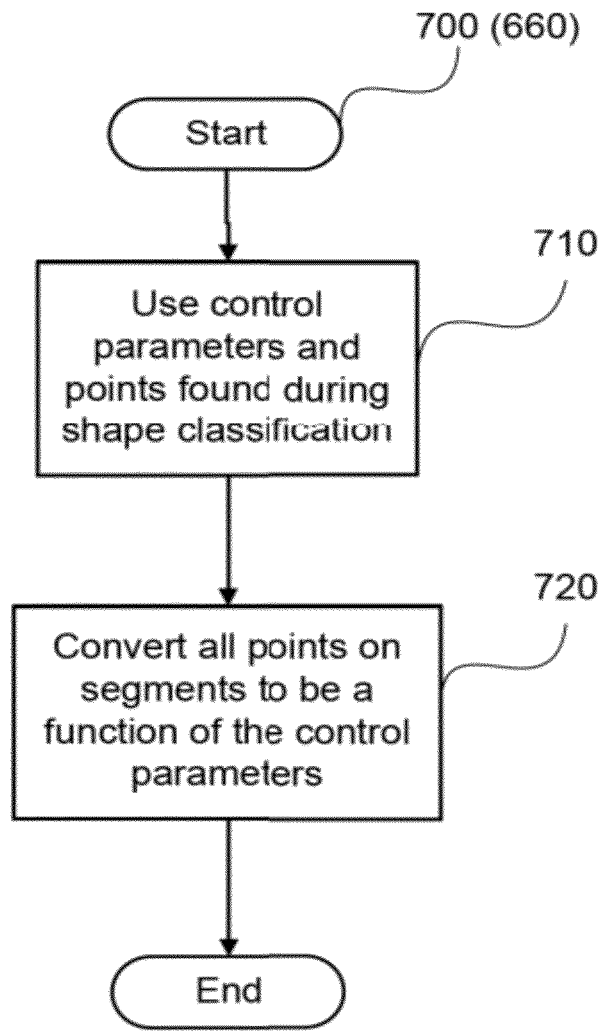
FIG. 7 is a flowchart showing how a non-template shape with control points may be created.

FIG. 7 illustrates a process 700 to create a non-template shape with control points as in step 660. The control parameters and associated control points found for the matching template shape at step 620 are assigned by the processor 1905 in step 710 as the control parameters for the non-template shape. In step 720 all the points that make up the segments of the freeform shape are converted by the processor 1905 to be functions of the template parameters, including control parameters and scaling and rotation. To produce a function that maps any curve segments of the freeform shape, the curve is assumed to be represented by two end points and one or more other points which define the curve. An example of this representation is a cubic Bezier curve. The scaling and rotation parameters are affine and there is a simple mapping from the freeform shape segments to these parameters. The control parameters may be non-affine making the mapping more complicated. However it may be the case that the template shape can be divided into two or more regions in which the modifications of the control parameters are affine. If this is the case then an affine mapping function can be constructed for each of the segments of the freeform shape depending on which of the divided regions of the template shape the segments are part of.

An example of step 720 is shown in FIGS. 8A to 8D, where a left arrow template shape 810 is shown that has been matched to the input freeform shape 820, discussed above with reference to FIG. 8E and also seen in FIG. 8A. The shape matching has selected a configuration of the arrow shape that is similar to the freeform shape, as seen by the overlap of the two shapes illustrated in FIG. 8A at 800. Locations for two control points 801 and 802 of the arrow template shape 810 are circled, however indicators (yellow diamonds, black squares) for the control points are not shown for the purpose of clarity. The control points 801 and 802 are each independently manipulable to respectively control the appearance of the arrow head region and the arrow shaft region of the template shape 810. The similarity measure for this example might be 86.26 out of 100, below an example threshold of 95. The matched arrow template shape 810 shows a number of regions of the geometry made according to the control points 813 and 814 of the matched arrow shape and its horizontal 811 and vertical 812 axes, as seen in FIG. 8B. Region boundaries 815, 816, 817 and 818 are indicated by dashed lines. The region boundary 815 is formed by extending a line parallel to the vertical axis of the matched arrow template shape 810 through the control point 814. The region boundary 816 is formed by extending a line parallel to the horizontal axis of the matched arrow template shape 810 through the control point 813. The region boundary 817 is the horizontal midline of the matched arrow template shape 810. The region boundary 818 is the reflection of boundary 816 through the horizontal midline 817. Moving control point 814 only changes the x-coordinate relative to the template shape 810, so the x-coordinate of the control point 814 is a control parameter. Moving control point 814 will move the boundary 815, which will scale each of the regions respectively. Moving control point 813 only changes the y-coordinate relative to the template shape 810, so the y-coordinate of the control point 813 is another control parameter. Moving control point 813 will move the boundaries 816 and 818 so that boundaries 816 and 818 are always equidistant from boundary 817. The four regions defined by these boundaries will scale respectively.

The regions from the matched template shape 810 are shown overlaid on the input freeform shape 820 in FIG. 8C. The control points 821 and 822 are indicated by circles and the region boundaries are shown by lines 823, 824, 825 and 826. Each region of the freeform shape will have a different function that map the segments from the control parameters and scaling to the output values of the non-template shape.

FIGS. 9A to 9E shows the five different regions 900, 910, 920, 930 and 940 of the input freeform shape 820 along with the region boundaries (unlabelled).

A function that maps the points defining the segments of the freeform shape in region 900 to the output coordinates x and y for the non-template shape is shown in Equation (2). The function transforms the points defining the segments of the created non-template shape based on the new position of a control point, giving a new control parameter value, or the x- and y-scaling of the created non-template shape. The function shown in Equation 2 is a scaling operation that scales all the points in region 900 with changes in the created non-template shape's first control parameter. In Equation 2:

variable xcp1 is the first control parameter and the x-coordinate of the first control point 822 of the template shape, the variable ycp2 is the second control parameter and the y-coordinate of the second control point 821 of the template shape, the constant ffcp1 is the original value of the x-coordinate for the first control point 822 of the freeform shape, the constant ffcp2 is the original value of the y-coordinate of the second control point 821 of the freeform shape, the variables sx and sy are the horizontal and vertical scaling respectively of the created non-template shape, the constants ffsx and ffsy are the original horizontal and vertical scaling of the freeform shape, and the constants xseg and yseg are the x- and y-coordinate of the points defining the segments of the freeform shape.

$$\begin{bmatrix} x \\ y \end{bmatrix}(xcp1, ycp2, sx, sy) = \begin{bmatrix} \frac{xcp1 \times sx}{ffsx \times ffcp1} & 0 \\ 0 & \frac{sy}{ffsy} \end{bmatrix} \begin{bmatrix} xseg \\ yseg \end{bmatrix} \quad (2)$$

A function that maps the points defining the segments of the freeform shape in region 940 to the output values for the non-template shape is shown in Equation (3). A function that maps the points defining the segments of the freeform shape in region 930 to the output values for the non-template shape is shown in Equation (4). A function that maps the points defining the segments of the freeform shape in region 920 to the output values for the non-template shape is shown in Equation (5). A function that maps the points defining the segments of the freeform shape in region 910 to the output values for the non-template shape is shown in Equation (6).

$$\begin{bmatrix} x \\ y \end{bmatrix} = \begin{bmatrix} \frac{sx(ffsx - xcp1)}{ffsx(ffsx - ffcp1)} & 0 \\ 0 & \frac{(ffsy - ycp2) \times sy}{ffsy(ffsy - ffcp2)} \end{bmatrix} \begin{bmatrix} xseg \\ yseg \end{bmatrix} + \begin{bmatrix} \frac{sx \times xcp1}{ffsx} - \frac{sx \times ffcp1(ffsx - xcp1)}{ffsx(ffsx - ffcp1)} \\ 0 \end{bmatrix} \quad (3)$$

$$\begin{bmatrix} x \\ y \end{bmatrix} = \begin{bmatrix} \frac{sx(ffsx - xcp1)}{ffsx(ffsx - ffcp1)} & 0 \\ 0 & \frac{(2 \times ycp2 - ffsy) \times sy}{ffsy(2 \times ffcp2 - ffsy)} \end{bmatrix} \begin{bmatrix} xseg \\ yseg \end{bmatrix} + \begin{bmatrix} \frac{sx \times xcp1}{ffsx} - \frac{sx \times ffcp1(ffsx - xcp1)}{ffsx(ffsx - ffcp1)} \\ \frac{sy \times (ffsy - ycp2)}{ffsy} - \frac{sy(ffsy - ffcp2)(ffsy - ycp2)}{ffsy(ffsy - ffcp2)} \end{bmatrix} \quad (4)$$

$$\begin{bmatrix} x \\ y \end{bmatrix} = \begin{bmatrix} \frac{sx(ffsx - xcp1)}{ffsx(ffsx - ffcp1)} & 0 \\ 0 & \frac{(2 \times ycp2 - ffsy) \times sy}{ffsy(2 \times ffcp2 - ffsy)} \end{bmatrix} \begin{bmatrix} xseg \\ yseg \end{bmatrix} + \begin{bmatrix} \frac{sx \times xcp1}{ffsx} - \frac{sx \times ffcp1(ffsx - xcp1)}{ffsx(ffsx - ffcp1)} \\ \frac{sy}{2} - \frac{sy(ffsy - ycp2)}{2(ffsy - ffcp2)} \end{bmatrix} \quad (5)$$

-continued $$\begin{bmatrix} x \\ y \end{bmatrix} = \begin{bmatrix} \frac{sx(ffsx - xcp1)}{ffsx(ffsx - ffcp1)} & 0 \\ 0 & \frac{(ffsy - ycp2) \times sy}{ffsy(ffsy - ffcp2)} \end{bmatrix} \begin{bmatrix} xseg \\ yseg \end{bmatrix} + \begin{bmatrix} \frac{sx \times xcp1}{ffsx} - \frac{sx \times ffcp1(ffsx - xcp1)}{ffsx(ffsx - ffcp1)} \\ \frac{sy \times ycp2}{ffsy} - \frac{sy \times ffcp2(ffsy - ycp2)}{ffsy(ffsy - ffcp2)} \end{bmatrix} \quad (6)$$

Equations (2) to (6), which map the freeform shape's points to the created non-template shape's points, are affine, consisting of a scaling term and an offset. The x-scaling and offset terms for Equations (3) to (6) are all identical, and only depend on the scaling sx and sy and the first control parameter xcp1. The x-scaling and offset scales the points due to the movement in region 823, which requires a scaling that is the opposite of that to Equation (2) for region 900, and an offset that depends on the initial and final locations of the region 823. The y-scaling and offset terms for Equations (3) to (6) are based on the movement of regions 824 and 826. The scaling terms for regions 910 and 940, corresponding to Equations (6) and (3) are identical, as they always have the same size. Similarly the scaling terms for regions 920 and 930, corresponding to Equations (5) and (4) are identical, as they always have the same size. Equations (3) and (6) differ because of the different offsets, which in the case of Equation (3) is always zero, and in Equation (6) is based on the location of region 824. Equations (4) and (5) differ because of the different offsets, which in the case of Equation (5) is the region 825, which doesn't depend on the control parameters and in Equation (4) is region 826.

Each of the functions of Equations (2) to (6) needs to be in a form representable in the output file description 150, so that a representation of the input shape may be formed by the description of the corresponding regions and control points. For example, the Microsoft™ OOXML standard has a set of operations that can be combined into a function including addition, subtraction, multiplication, division, many trigonometric functions and an if-then-else operator. Equations 2 to 6 can be represented with the OOXML set of operators, with each point of the line or curve segments requiring a separate function to calculate the point. The input line freeform 830 seen in FIG. 8D shows an example of a non-closed input line freeform which could be processed to produce a non-template shape with control points, by linking the two ends of the line together to create an input freeform shape.

Figure 10:
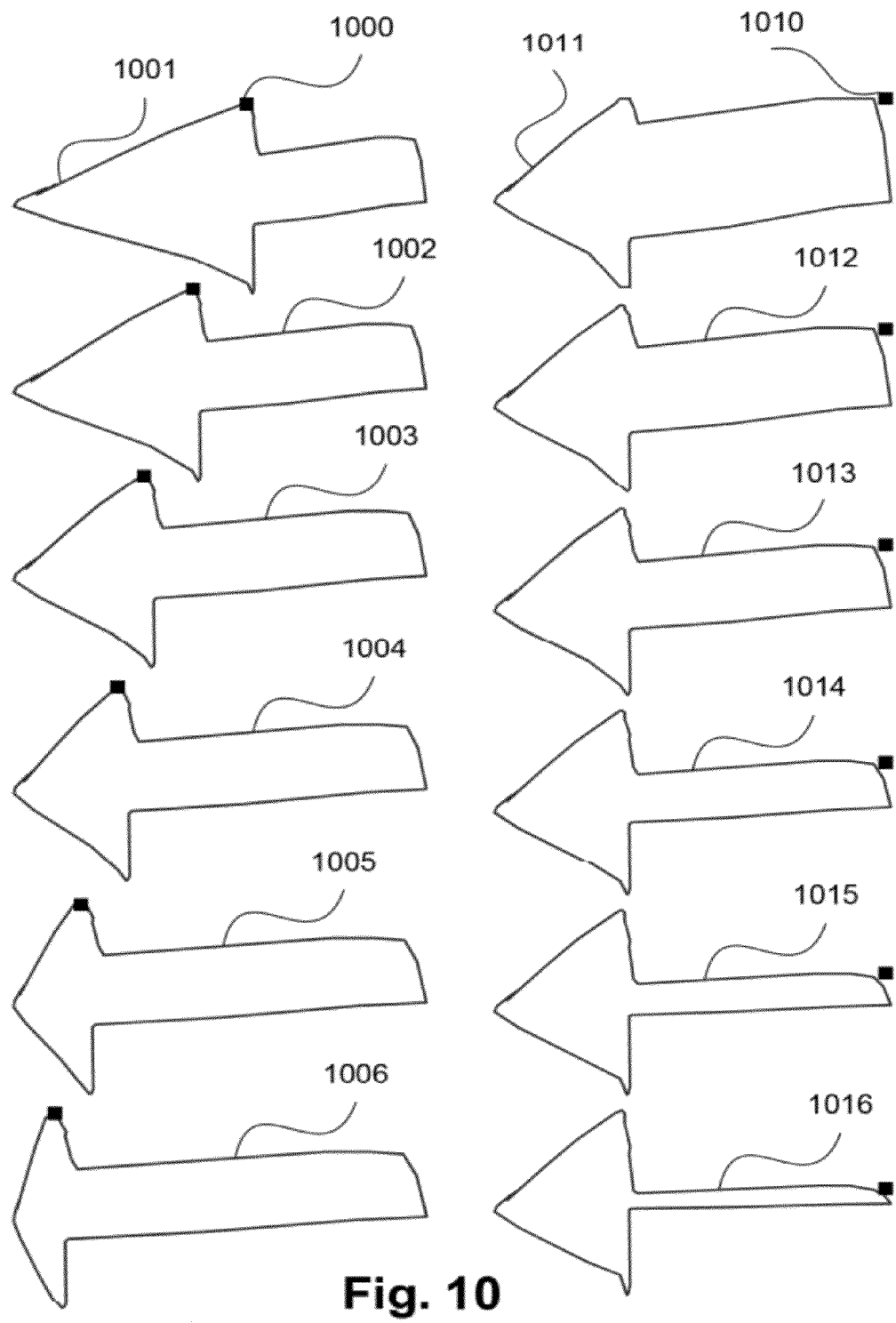
FIG. 10 shows an example non-template shape with control points.

FIG. 10 illustrates an example non-template shape with two control points based on those of a left arrow template, the non-template shape being illustrated in twelve different geometrical modifications 1001-1006 and 1011-1016. The two control points are shown as 1000 and 1010. Shapes 1001 to 1006 show geometrical modifications arising from different positions of the control point 1000. Shapes 1011 to 1016 show geometrical modifications arising from different positions of the control point 1010. Note that each control point can be moved independently of the other.

The creation of non-template shapes with control points does not in any way effect the ability of the created shapes to have similar or identical line thickness, line colour, or fill colour to the input freeform shape. For many inputs, it is possible for the output non-template shape with control points to produce an identical image to the image of the input freeform shape.

The net effect of the regional division of the input freeform shape and the identification and manipulation of the control points 1000 and 1010 is to permit the input freeform shape to be treated as, and be editable like, a template shape, whilst retaining the freeform appearance of the freeform shape. In FIG. 10, the manipulation of the control points 1000 and 1010 provide for the length and breadth of the two resolvable controllable regions of the freeform shape (the arrow head and the arrow shaft) to be user manipulable, to be able to give rise to, for example, the freeform shapes 1001-1006 and 1011-1016, all of which retain their freeform appearance. Such is also distinguishable from the control point manipulation seen by comparing FIGS. 8E and 8F which arguably alters the freeform shape in a manner that significantly alters the shape, without consideration of regions of the shape, merely individual points and attached segments.

A significant advantage of the regional division and manipulation of a freeform shape is that a user may desired the relaxed appearance of a freeform shape (in comparison to a refined template shape) but wish to reproduce that shape in a document with consistency whilst being able to alter the size and general characteristics (length, breadth etc.) without significantly departing from the original appearance.

Figure 11:
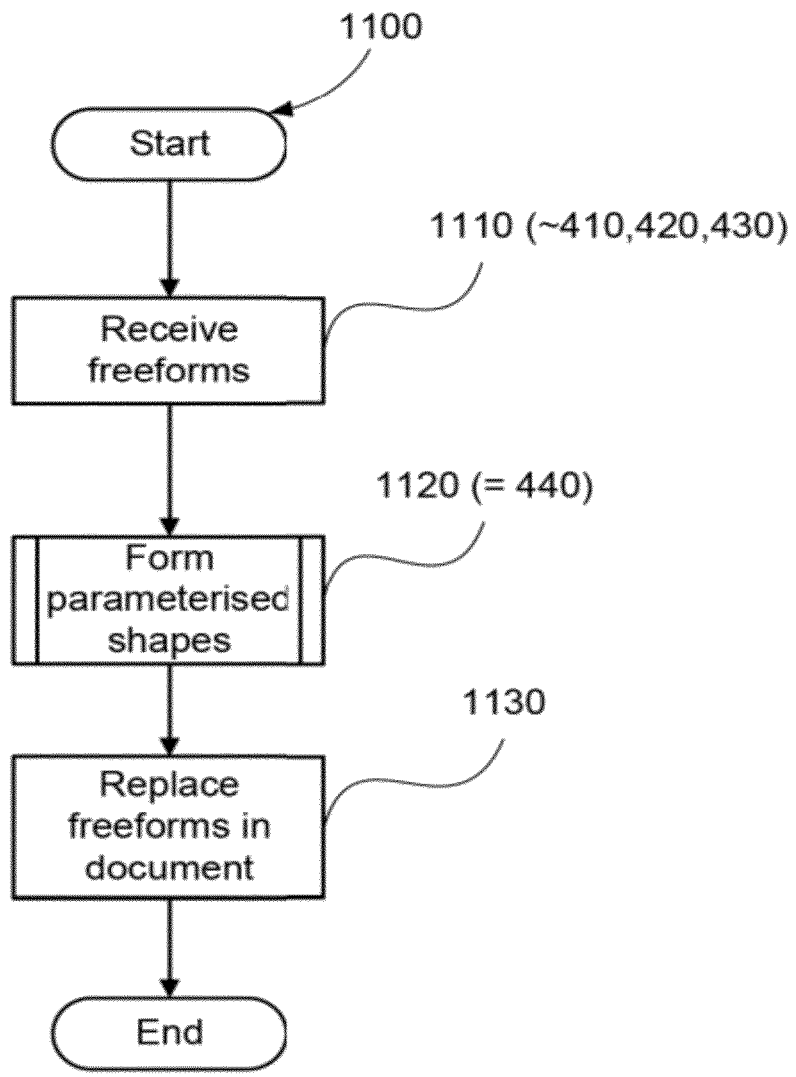
FIG. 11 is a flowchart showing the second approach for shape parameterisation.

A second approach 1100 of processing the input document image 110 to generating an editable document output file 150 is now described with reference to FIG. 11. The method 1100 is again preferably realised by software executable by the processor 1905 of the computer system 1900 and operates to modify an existing document to replace any freeform shapes with either template shapes or non-template shapes with control points. At step 1110, the freeform shapes are extracted from the document. Step 1110 is essentially equivalent to steps 410, 420 and 430 of FIG. 4. At step 1120, the input freeform shapes are converted to either template shapes or non-template shapes with control points. This step is the same as step 440 described above with reference to FIG. 4. In step 1130 the input freeform shapes are replaced in the document with template shapes or non-template shapes with control points, this being an alternative to step 450 of FIG. 4. Alternatively, this approach can be used to copy template shapes onto the clipboard so that the shapes can be cut and pasted into another program with a different set of template shapes.

Figure 12:
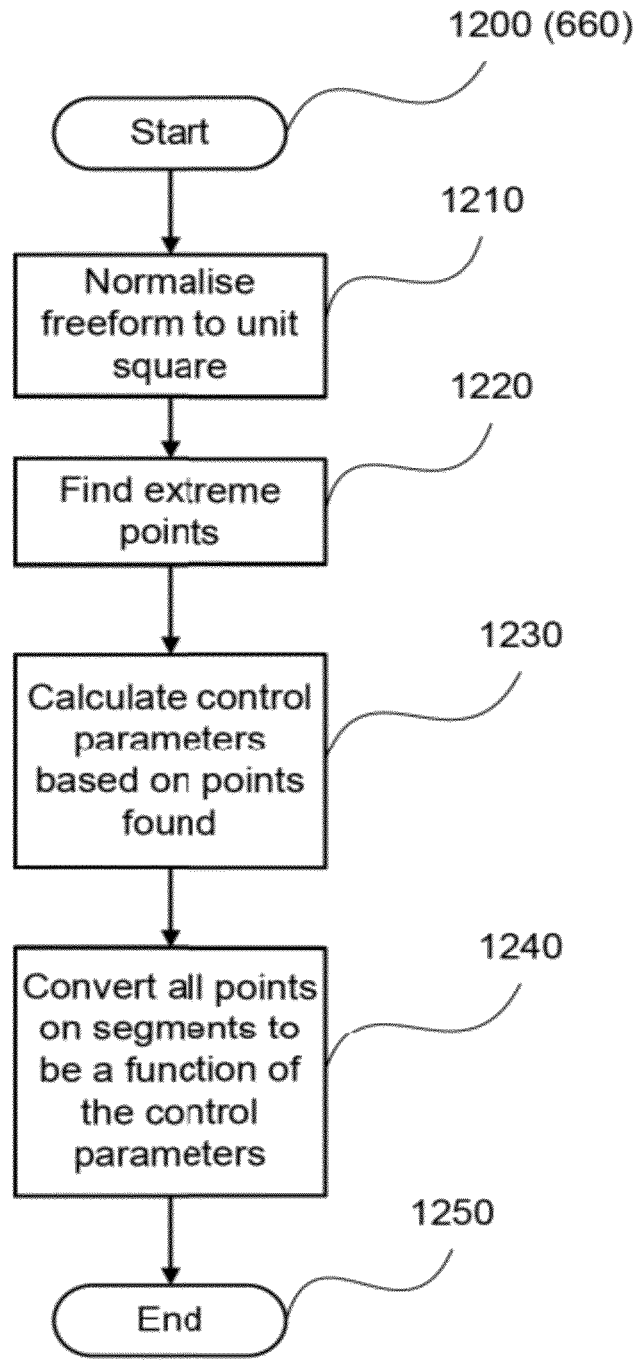
FIG. 12 is a flowchart showing the third approach for shape parameterisation.

A third approach is now described which is similar to the first approach of FIG. 4 except that the non-template shape with control points creation process 660, detailed in FIG. 7, is alternatively performed according to the process 1200, described below with reference to FIG. 12. In step 1210, the input freeform shape is normalised to a unit square by affine transform. The affine transform is chosen so that the bounding box of the normalised freeform shape for example is (0,0)-(1,0)-(1,1)-(0,1). The affine transformation includes a rotational component the angle of which is the negative of the angle calculated from the best template shape match in step 620. Alternatively another method to determine an angle could be used, such as the principle axis angle calculated from the central moments. In some cases the principle axis will give a useful angle. Alternatively the specific template shape may be rotationally symmetric and no rotation component is needed. In step 1220 one or more extreme points are found. Which extreme points are found depends on the specific template shape that the freeform shape was classified as closest to in step 620. For example extreme points may be points closest to a particular edge of the unit square, or closest to a particular corner of the unit square, or closest to the centre of the unit square.

Figure 13A:
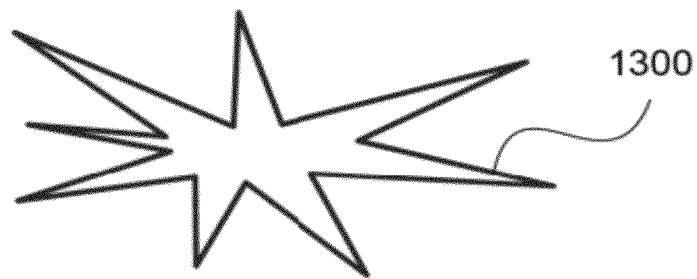
FIGS. 13A to 13D show example input freeform objects and how the control points may be found.
Figure 13B:
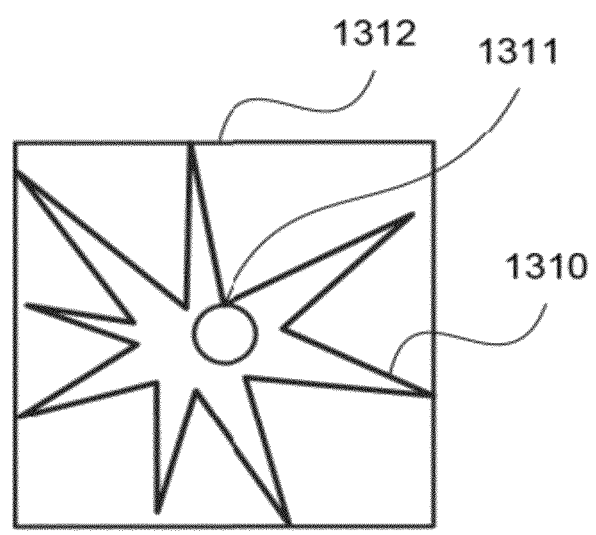

FIG. 13A shows an example input freeform shape 1300 which has a closest template match of an 8-point star, such as the shape 27021 in FIG. 2A. FIG. 13B shows the freeform shape 1300 affine normalised to a unit square 1312 and shown as freeform shape 1310. A circle is centred on the unit square showing the closest point 1311 to the centre of the unit square. The point 1311 may be considered as the extreme point for this type of template shape.

Figure 13C:
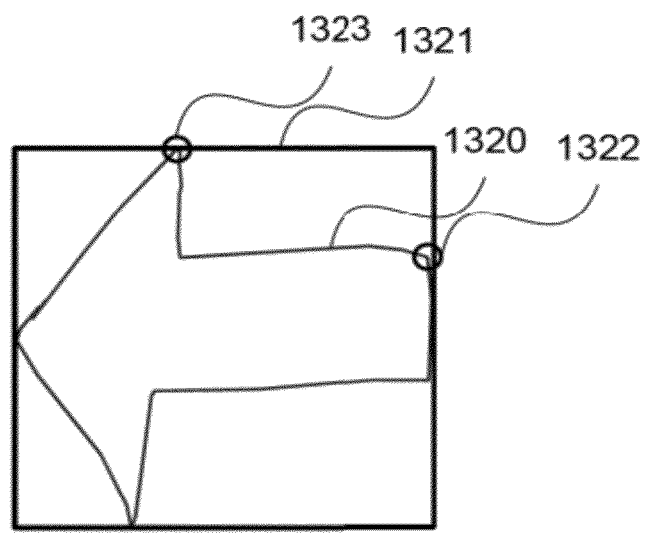

As another example, if the template shape is a left arrow 810 as shown as in FIG. 8, then the extreme points are determined as the top-leftmost point 1323 and the top-rightmost point 1322 as seen in FIG. 13C. The top-leftmost point is the point that has the smallest x-coordinate among the points with the largest y-coordinate within some tolerance. The top-rightmost point is the point that has the largest y-coordinate among the points with the largest x-coordinate within some tolerance. The left arrow 810 is shown affine normalised to the unit square 1321 as freeform shape 1320 with the extreme points 1322 and 1323.

Figure 14:
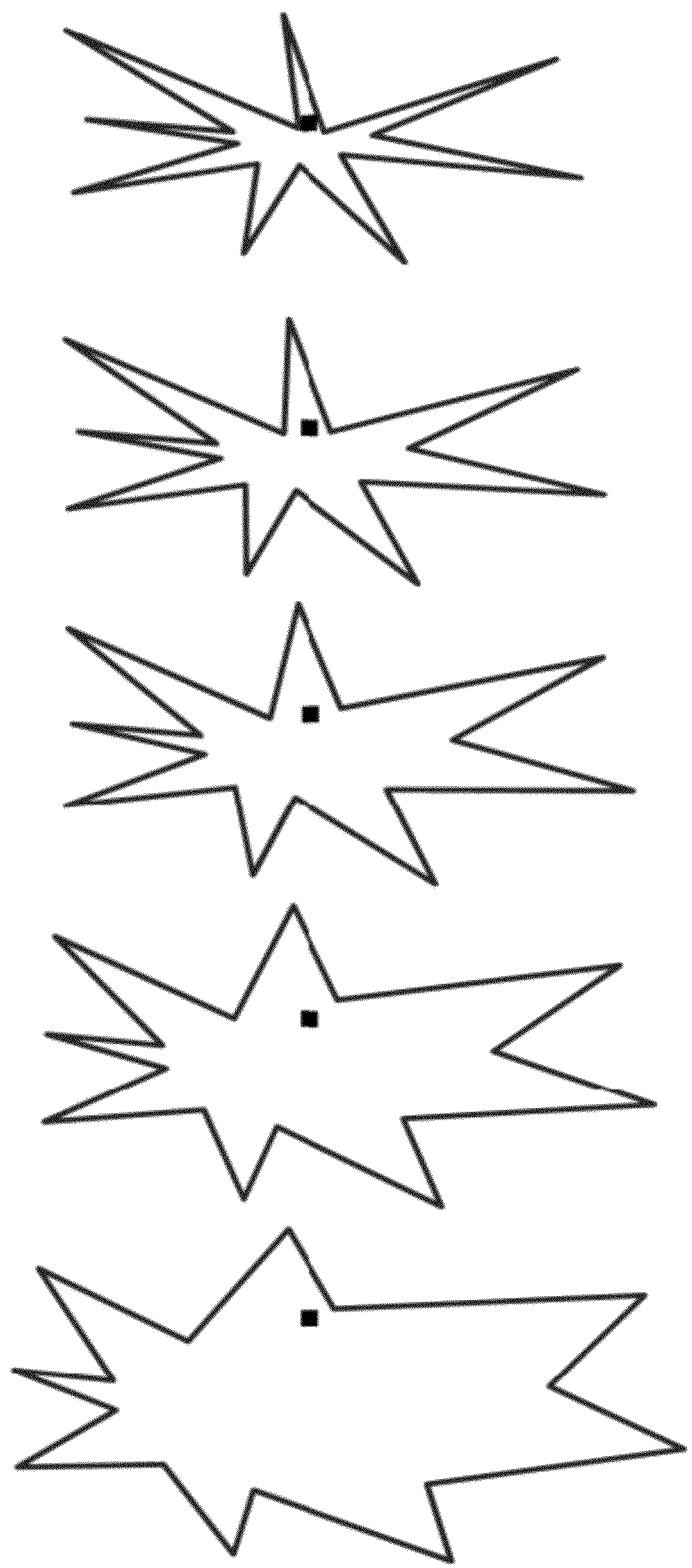
FIG. 14 shows an example non-template shape with a control point.

Once the extreme points are found at step 1220, the control parameters are calculated by the processor 1905 from the values of the extreme points at step 1230. This calculation depends on the specific template shape as classified in step 660 and is a function of the x- and y-coordinates of all extreme points found. In general it will be either the x-coordinate or y-coordinate, or both of the extreme points found. For example, for the left-arrow template shape 810, the x-coordinate of the top-leftmost extreme point is one control parameter, and the y-coordinate of the top-rightmost extreme point is the second control parameter. In the multi-point star example 1300, the distance from the centre of the unit square to the closest point 1311 is the control parameter, and is shown as the circle in FIG. 13B. FIG. 14 shows some example control point positions for the multi-point star input freeform shape 1300, when converted to a non-template shape with control points.

Once the control parameters have been calculated at step 1230, all the points on the input freeform shape's segments are converted to be a function of the control parameters in step 1240. This step is the same as step 720 previously described. The process 1200 terminates at step 1250 where processing return to step 670 as previously described.

Figure 15:
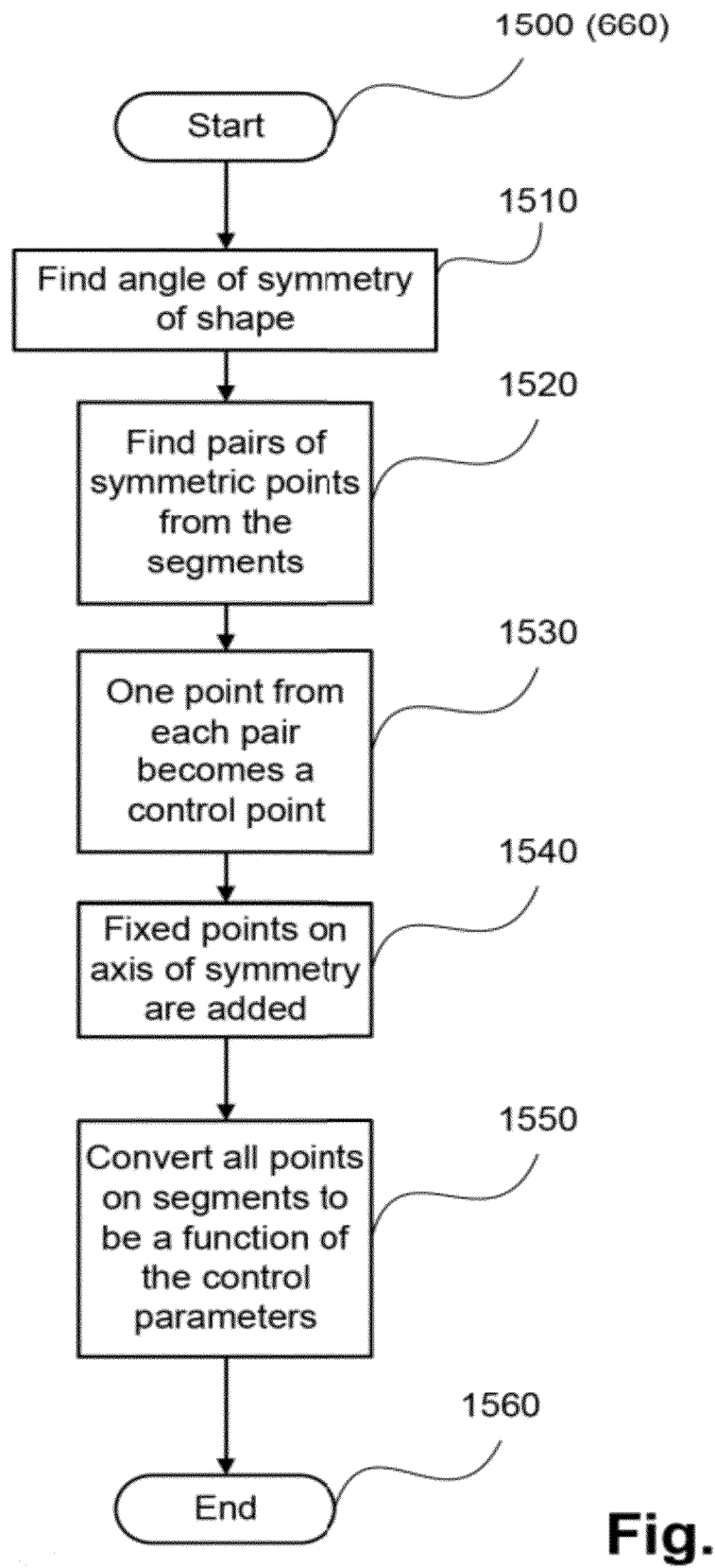
FIG. 15 is a flowchart showing the fourth approach for shape parameterisation.
Figure 16:
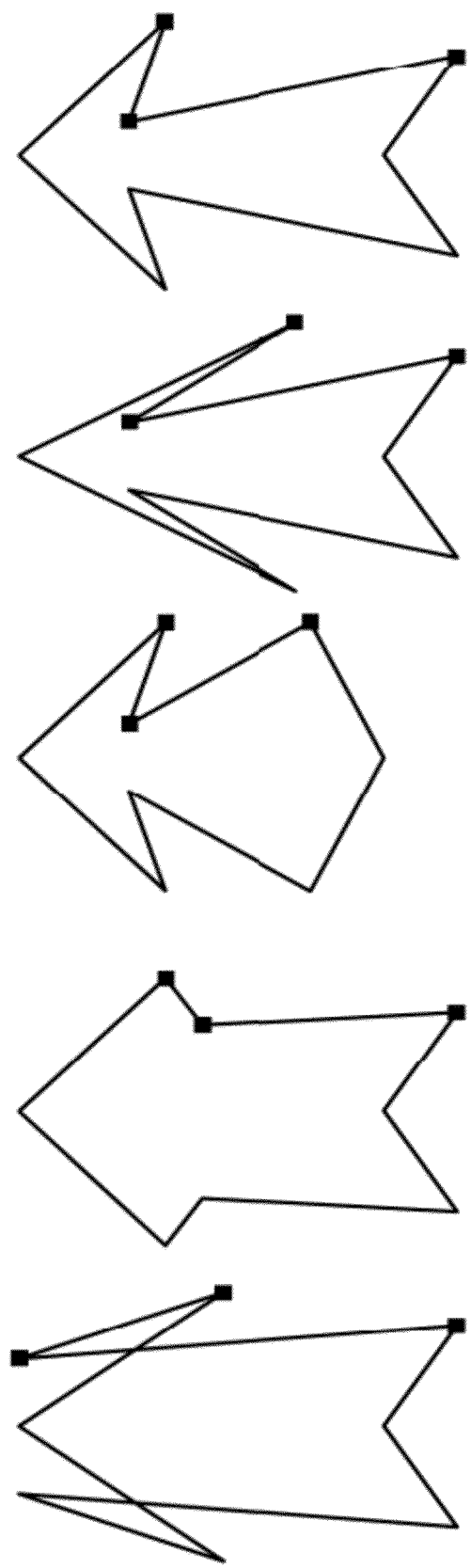
FIG. 16 shows an example non-template symmetric shape with control points.

A fourth approach is now described which is similar to the first approach 400 except that the non-template shape with control points creation process 660 seen in FIG. 6 is alternatively performed according to a process 1500, described below with reference to FIG. 15. In step 1510, the angle of symmetry of the input freeform shape is calculated by the processor 1905. The symmetry that is useful in this arrangement is reflectional symmetry, so an angle of symmetry of an object is an angle to the x-axis at which a line of symmetry can found so that any perpendicular line drawn intersects the object at equal distances from the line of symmetry on either side. A template shape can be defined herein called the symmetric template, in which any point above the line of symmetry is a control point, and any movements to the control point above the line of symmetry have an equal symmetric effect on the equivalent point below the line of symmetry. An example of this type of template shape is shown in FIG. 16, which shows a symmetric arrow type with control points in various different positions. In each case there is reflectional symmetry along a generally horizontal axis of the object.

The angle of symmetry found at step 1510 can be found using image moments. Due to possible noise in the non-template shape, for example from scanning or poor manual drawing, or from the shape not having a perfect mirror axis (e.g. FIG. 8E), some tolerance of imperfect symmetry may be needed to determine the angle of symmetry. At step 1520 pairs of symmetric points are found from the segments of the input freeform shape. One point in the pair will be above the line of symmetry and one will be below. In general a limited number of such pairs should be selected so that the non-template shape generated does not become too complicated and the behaviour on modification of control parameters is intuitive. At step 1530 one point from each pair becomes a control point. While all control points may be on one side of the line of symmetry, this is not a requirement. Instead each control point may have two control parameters, the x- and y-coordinate locations, so that there are no restrictions on the movement of the control points.

Figure 20A:
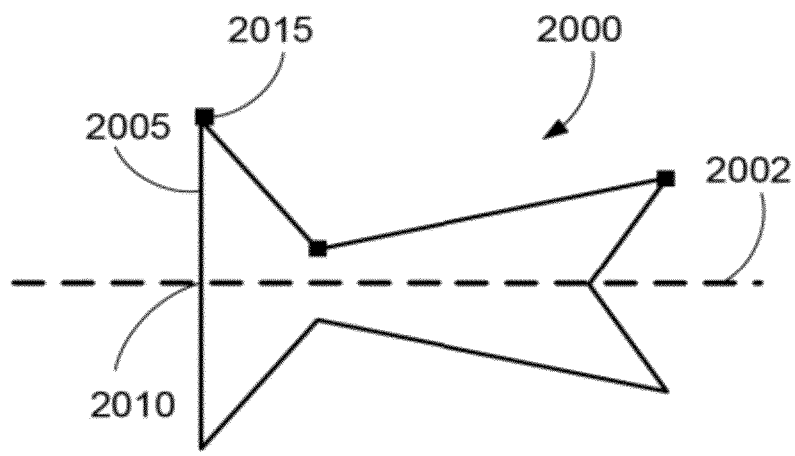
FIGS. 20A and 20B show an example non-template shape with an additional fixed point; and Appendix A is a table listing the names of each of the Microsoft™ AutoShapes of FIGS. 2A and 2B together with their corresponding drawing reference.
Figure 20B:
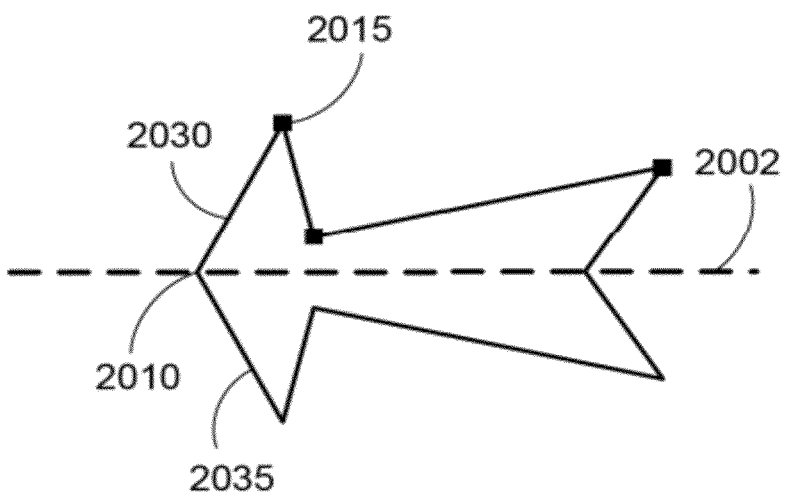

In step 1540 more fixed points are added to the new non-template shape with control points calculated by the processor 1905 where the line of symmetry intersects with the input freeform shape. These points only need to be added if there are no existing points at these locations. The fixed points added to the non-template shape creates will divide a single segment in the non-template into two. A control point is then able to modify the two segments based on symmetry. FIG. 20A shows a non-template shape 2000 with a segment 2005 that crosses the line of symmetry 2002. The shape 2000 has a control point 2015. A fixed point 2010 can be added at the line of symmetry to split or divide segment 2005 into two segments. The two segments 2030 and 2035 can be clearly seen in FIG. 20B where the control point 2015 can be moved in either or both of the x and y directions to manipulate the two segments, for example as illustrated in FIG. 20B. The point 2010 remains fixed on the axis 2002.

Once the control parameters have been calculated at step 1540, all the points on the input freeform shape's segments are converted to be a function of the control parameters in step 1550. This step is the same as step 720 previously described. At the end of this process at step 1560 processing continues at step 670 from the first embodiment.

Figure 13D:
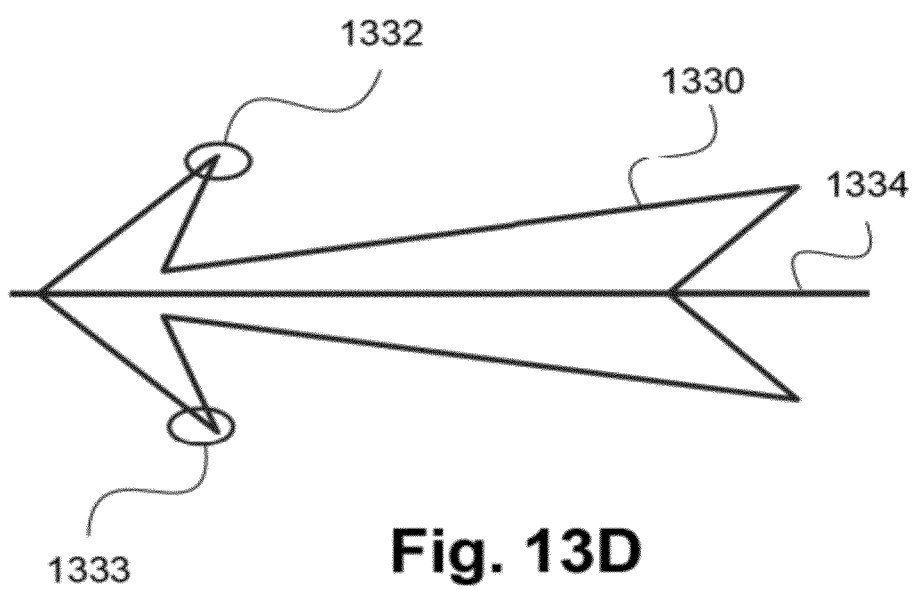

An example of process 1500 is shown in FIG. 13D. The input freeform shape 1330 is shown with line of symmetry 1334. As there are points already at the locations where the line of symmetry intersects the freeform shape 1330, no extra points need to be added. Points 1332 and 1333 are a symmetric pair, so if point 1332 is made into a control point, then the point 1332 will control the position of point 1333, so that both points 1332 and 1333 continue to be a symmetric pair.

Figure 17:
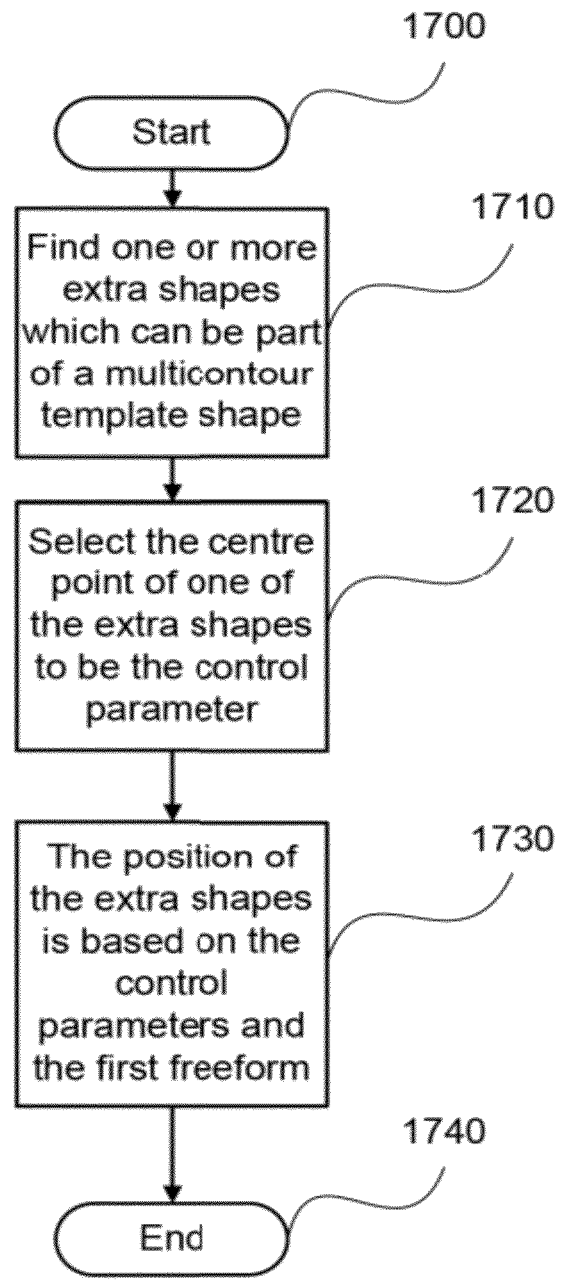
FIG. 17 is a flowchart showing the fifth approach for shape parameterisation.

A fifth approach is now described which is similar to the first approach 400 except that the non-template shape with control points creation process 660, is alternatively performed according to the process 1700 described below with reference to FIG. 17.

In step 1710, one or more extra shapes are found which match with the input freeform shape and a multi-contour template shape. A multi-contour shape is a collection of two or more shapes which behave as a single shape. An example multi-contour template shape, called the "cloud callout" is shown in FIG. 18C, with the main shape contour shown as a cloud 1820 and three extra shape contours shown as circles 1821, 1822 and 1823.

The extra shapes may be freeform shapes, or template shapes or non-template shapes with control points may be identified from a database stored in memory 1906 or in the HDD 1910. The multi-contour template may define a match based on the ratio of areas of the input freeform shape and the extra shapes, or some other moment or geometry based method such as the ratio of the distances between the centres of the input freeform shape and the extra shapes.

In step 1720, the centre point of one of the extra shapes is selected and assigned as the control point of the multi-contour shape. It may be useful for this control point to have free movement, in which case the control parameters are based on the x- and y-coordinates of the control point.

In step 1730, the position of the extra shapes is given by a function of the control parameters calculated in step 1720 and the input freeform shape, which becomes the main contour for the multi-contour shape. The function is created so that the initial control parameter values give the initial positions of the extra shapes, and may be a ratio of the distance from the control point to the centre of the main contour. Note that the input freeform shape or any of the extra shapes may also have control parameters of their own. The control parameters added during the process 1700 generally only control the locations of the extra shapes relative to the input freeform shape, and not any of the other parameters of the extra shapes.

Once the control parameters have been calculated at step 1730, all the points on the input freeform shape's segments are converted to be a function of the control parameters. This step is the same as step 720 as described above. At step 1740 which ends the process 1700, processing returns to at step 670 of the first approach.

An example multi-contour template shape, called the "cloud callout" is shown in FIG. 18C, with the main shape contour shown as a cloud 1820 and three extra shape contours shown as circles 1821, 1822 and 1823. The defining characteristics of this multi-contour template are the ratio of the distances of the three extra shapes to the centre of the main shape, and that the three extra shapes centres lie on a line that passes through the centre of the main shape. The control point of the multi-contour template shape is the centre of the shape 1823, which has free movement, and changes the position of the three extra contours 1821 to 1823 with regard to the main shape contour 1820.

Figure 18A:
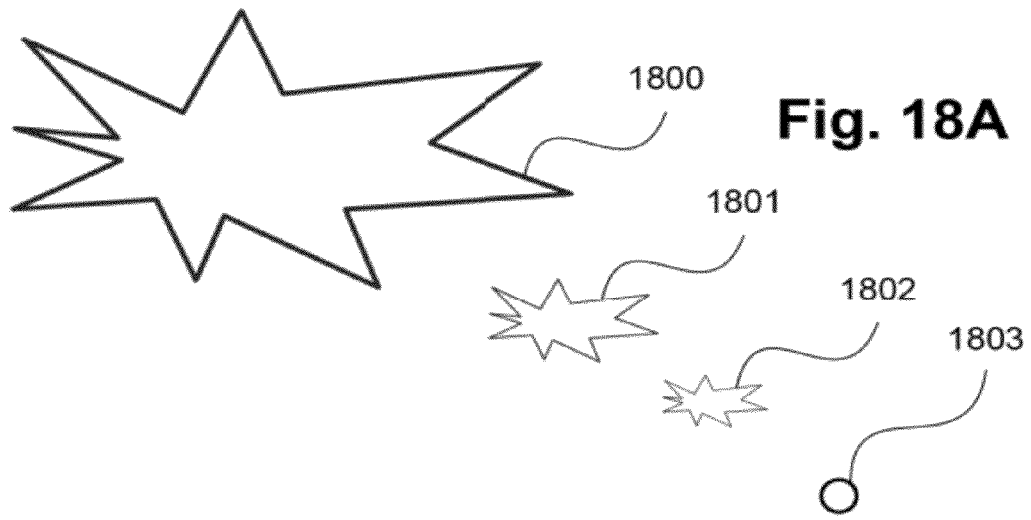
FIGS. 18A to 18C show an example template and non-template multi-contour shapes with control points.
Figure 18B:
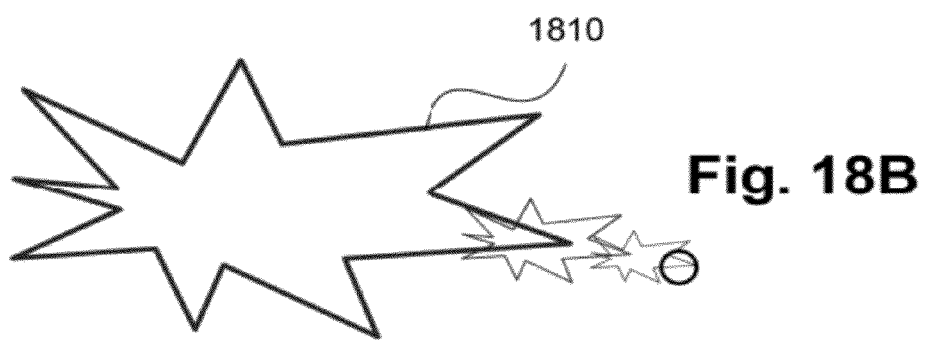
Figure 18C:
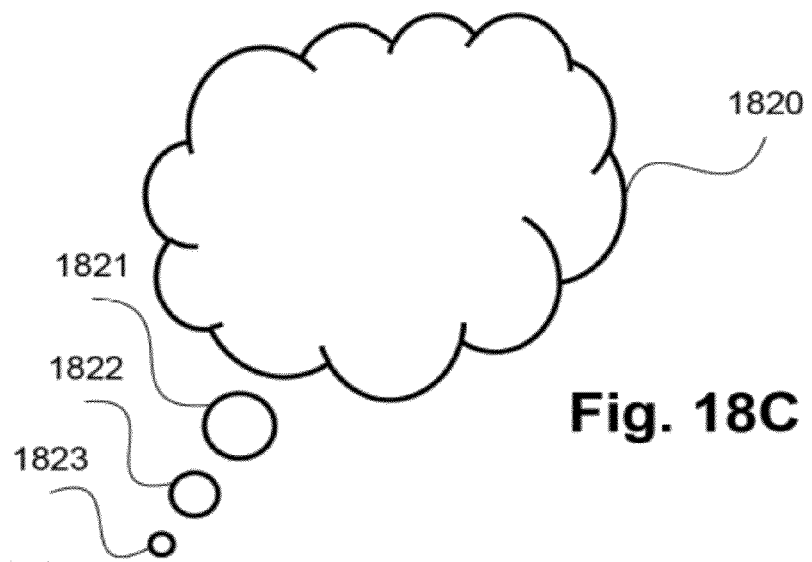

An example input freeform shape for process 1700 is shown as a star-like shape 1800, as seen in FIG. 18A. There are three other shapes which may be found during process 1700 as 1801, 1802 and 1803. Note that the star-like shapes, 1800, 1801 and 1802 may have control parameters of their own. The centre point of the shape 1803 may be selected as the control point for the multi-contour shape consisting of shapes 1800 to 1803, and may control the positions of the three extra shapes 1801 to 1803 relative to the main contour shape 1800. Adjusting the control parameter at the centre of shape 1803 may result in the shape 1810, as seen in FIG. 18B.

INDUSTRIAL APPLICABILITY

The arrangements described are applicable to the computer and data processing industries and particularly for the generation of editable documents from bitmap document images.

The foregoing describes only some embodiments of the present invention, and modifications and/or changes can be made thereto without departing from the scope and spirit of the invention, the embodiments being illustrative and not restrictive.

Appendix A

TABLE 1

| SHAPE NAME | REFERENCE |
| --- | --- |
| Rectangle | 27001 |
| Round Rectangle | 27002 |
| Ellipse | 27003 |
| Diamond | 27004 |
| Isosceles Triangle | 27005 |
| Right Triangle | 27006 |

TABLE 1-continued

| SHAPE NAME | REFERENCE |
| --- | --- |
| Parallelogram | 27007 |
| Trapezoid | 27008 |
| Hexagon | 27009 |
| Octagon | 27010 |
| Plus Sign | 27011 |
| Star | 27012 |
| Arrow | 27013 |
| Thick Arrow | 27014 |
| Home Plate | 27015 |
| Balloon | 27016 |
| Seal | 27017 |
| Plaque | 27018 |
| Chevron | 27019 |
| Pentagon | 27020 |
| Seal8 | 27021 |
| Seal16 | 27022 |
| Seal32 | 27023 |
| Wedge Rectangle Callout | 27024 |
| Wedge Rrect Callout | 27025 |
| Wedge Ellipse Callout | 27026 |
| Wave | 27027 |
| Left Arrow | 27028 |
| Down Arrow | 27029 |
| Up Arrow | 27030 |
| Left Right Arrow | 27031 |
| Up Down Arrow | 27032 |
| Irregularseal1 | 27033 |
| Irregularseal2 | 27034 |
| Lightning Bolt | 27035 |
| Heart | 27036 |
| Quad Arrow | 27037 |
| Left Arrow Callout | 27038 |
| Right Arrow Callout | 27039 |
| Up Arrow Callout | 27040 |
| Down Arrow Callout | 27041 |
| Left Right Arrow Callout | 27042 |
| Up Down Arrow Callout | 27043 |
| Quad Arrow Callout | 27044 |
| Left Up Arrow | 27045 |
| Bent Up Arrow | 27046 |
| Bent Arrow | 27047 |
| Seal24 | 27048 |
| Notched Right Arrow | 27049 |
| Block Arc | 27050 |
| Circular Arrow | 27051 |
| U Turn Arrow | 27052 |
| Flow Chart Process | 27053 |
| Flow Chart Decision | 27054 |
| Flow Chart Input Output | 27055 |
| Flow Chart Document | 27056 |
| Flow Chart Terminator | 27057 |
| Flow Chart Preparation | 27058 |
| Flow Chart Manual Input | 27059 |
| Flow Chart Manual Operation | 27060 |
| Flow Chart Connector | 27061 |
| Flow Chart Punched Card | 27062 |
| Flow Chart Punched Tape | 27063 |
| Flow Chart Extract | 27064 |
| Flow Chart Merge | 27065 |
| Flow Chart Online Storage | 27066 |
| Flow Chart Magnetic Tape | 27067 |
| Flow Chart Display | 27068 |
| Flow Chart Delay | 27069 |
| Flow Chart Alternate Process | 27070 |
| Flow Chart Off Page Connector | 27071 |
| Left Right Up Arrow | 27072 |
| Moon | 27073 |
| Seal4 | 27074 |
| Double Wave | 27075 |
| Cube | 27076 |
| Can | 27077 |
| Donut | 27078 |
| Ribbon | 27079 |
| Ribbon2 | 27080 |
| No Smoking | 27081 |
| Folded Corner | 27082 |
| Bevel | 27083 |
| Striped Right Arrow | 27084 |

TABLE 1-continued

| SHAPE NAME | REFERENCE |
|---|---|
| Vertical Scroll | 27085 |
| Horizontal Scroll | 27086 |
| Curved Right Arrow | 27087 |
| Curved Left Arrow | 27088 |
| Curved Up Arrow | 27089 |
| Curved Down Arrow | 27090 |
| Cloud Callout | 27091 |
| Ellipse Ribbon | 27092 |
| Ellipse Ribbon 2 | 27093 |
| Flow Chart Predefined Process | 27094 |
| Flow Chart Internal Storage | 27095 |
| Flow Chart Multidocument | 27096 |
| Flow Chart Summing Junction | 27097 |
| Flow Chart Or | 27098 |
| Flow Chart Collate | 27099 |
| Flow Chart Sort | 27100 |
| Flow Chart Offline Storage | 27101 |
| Flow Chart Magnetic Disk | 27102 |
| Flow Chart Magnetic Drum | 27103 |
| Sun | 27104 |

I claim:

1. A method of forming an output shape parameterised by control points from an input shape, the method being performed by a computer processor and comprising:
   (a) receiving the input shape formed by a plurality of segments;
   (b) classifying the input shape as one of a plurality of predefined template shapes;
   (c) determining a representative form for the input shape based on a similarity measure between the input shape and the classified template shape, the representative form being selected according to the similarity measure from the group consisting of the classified template shape-, and a non-template shape based on the segments of the input shape, the non-template shape having at least one control point derived from at least one control point of the classified template shape; and
   (d) storing in a memory associated with the computer processor the determined representative form as the output shape parameterised by the derived control points.

2. The method according to claim 1 wherein the non-template shape with control points is formed by the steps of:
   (i) assigning each of the segments of the input shape to one of a number of regions of the classified template shape, each of the number of regions being assigned to a corresponding one of the control points of the classified template shape;
   (ii) describing the segments in terms of the regions associated with at least one control point for geometrical modification of the segments; and
   (iii) forming a representation of the input shape by the description of each region and at least one control point.

3. The method according to claim 1 wherein the non-template shape with control points is formed by the steps of:
   normalising the input shape to a unit square;
   identifying extreme points of the normalised shape;
   calculating the control parameters of the non-template shape based on the identified extreme points; and
   converting points on each of the segments of the input shape to be functions of the calculated control parameters.

4. The method according to claim 1 wherein the non-template shape with control points is formed by the steps of:
   determining an angle associated with a line of symmetry of the input shape associated;
   identifying symmetric pairs of points on the segments using the determined angle and line of symmetry;
   setting the identified points as control points; and
   converting points on each of the segments of the input shape to be functions of control parameters that correspond to the derived control points.

5. The method according to claim 4 further comprising:
   adding at least one fixed point at an intersection between the line of symmetry and the template shape to split a segment of the non-template shape.

6. The method according to claim 1 wherein the non-template shape with control points is formed by the steps of:
   identifying a plurality of further shapes matching the input shape;
   selecting a centre point of one of the identified further shapes as a control point;
   assigning the control point of the further shape as a control point for the non-template shape; and
   converting a position of any remaining shape of the further shapes to be functions of the assigned control point.

7. A method of creating an output document, said method being performed by a processor and comprising:
   segmenting an input image to form a set of objects corresponding to regions of the input image;
   analysing content of the input image to select objects corresponding to figure elements in the input image;
   forming, from the selected objects, input shapes, each having at least one line segment or one curve segment;
   forming an output shape parameterised by control parameters from one of the input shape shapes according to the method of claim 1; and
   writing the output shape to a document.

8. A method of creating an output document, said method being performed by a computer having at least a processor, the method comprising:
   receiving at the computer an input image of an input document including at least one freeform object;
   segmenting the input image to form a set of objects corresponding to regions of the input image;
   analysing content of the input image to select objects corresponding to figure elements in the input image;
   forming, from the selected objects, input shapes each having at least one line segment or one curve segment, at least one input shape being a freeform shape corresponding to the freeform object;
   forming an output shape parameterised by control parameters from the freeform shape according to the method of claim 1; and
   replacing the freeform object in the input document with the output shape to form an output document.

9. A non-transitory tangible computer readable storage medium having a program recorded thereon, the program being executable by computer apparatus to form an output shape parameterised by control points from an input shape, the program comprising:
   code for receiving the input shape formed by a plurality of segments;
   code for classifying the input shape as one of a plurality of predefined template shapes;
   code for determining a representative form for the input shape based on a similarity measure between the input shape and the classified template shape, the representative form being selected according to the similarity measure from the group consisting of the classified template shape, and a non-template shape based on the segments of the input shape, the non-template shape having at least one control point derived from at least one control
point of the classified template shape; and
code for storing the determined representative form as the
output shape parameterised by the derived control
points.

10. The computer readable storage medium according to claim 9, wherein the program comprises code for forming the non-template shape with control points is formed including:
  code for assigning each of the segments of the input shape to one of a number of regions of the classified template shape, each of the number of regions being assigned to a corresponding one of the control points of the classified template shape;
  code for describing the segments in terms of the regions associated with at least one control point for geometrical modification of the segments; and
  code for forming a representation of the input shape by the description of each region and at least one control point.

11. The computer readable storage medium according to claim 9, wherein program comprises code for forming the non-template shape with control points is formed including:
  code for normalising the input shape to a unit square;
  code for identifying extreme points of the normalised shape;
  code for calculating the control parameters of the non-template shape based on the identified extreme points; and
  code for converting points on each of the segments of the input shape to be functions of the calculated control parameters.

12. The computer readable storage medium according to claim 9, wherein the program comprises code for forming the non-template shape with control points including:
  code for determining an angle associated with a line of symmetry of the input shape associated;
  code for identifying symmetric pairs of points on the segments using the determined angle and line of symmetry;
  code for setting the identified points as control points;
  code for converting points on each of the segments of the input shape to be functions of control parameters that correspond to the derived control points.

13. The computer readable storage medium according to claim 12 further comprising:
  code for adding at least one fixed point at an intersection between the line of symmetry and the template shape to split a segment of the non-template shape.

14. The computer readable storage medium according to claim 9, wherein the program comprises code for forming the non-template shape with control points including:
  code for identifying a plurality of further shapes matching the input shape;
  code for selecting a centre point of one of the identified further shapes as a control point;
  code for assigning the control point of the further shape as a control point for the non-template shape; and
  code for converting a position of any remaining shape of the further shapes to be functions of the assigned control point.

15. Computer apparatus having at least a processor and a memory program and configured to form an output shape parameterised by control points from an input shape, the computer apparatus comprising:
  means for receiving the input shape formed by a plurality of segments;
  means for classifying the input shape as one of a plurality of predefined template shapes;
  means for determining a representative form for the input shape based on a similarity measure between the input shape and the classified template shape, the representative form being selected according to the similarity measure from the group consisting of the classified template shape, and a non-template shape based on the segments of the input shape, the non-template shape having at least one control point derived from at least one control point of the classified template shape; and
  means for storing the determined representative form as the output shape parameterised by the derived control point.

* * * * *